(12) United States Patent
Cruz Hernandez

(10) Patent No.: US 10,613,626 B2
(45) Date of Patent: Apr. 7, 2020

(54) KINESTHETICALLY ENABLED GLOVE

(71) Applicant: IMMERSION CORPORATION, San Jose, CA (US)

(72) Inventor: Juan Manuel Cruz Hernandez, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 16/010,177

(22) Filed: Jun. 15, 2018

(65) Prior Publication Data

US 2019/0384390 A1 Dec. 19, 2019

(51) Int. Cl.
| | | |
|---|---|---|
| *G06F 3/01* | (2006.01) | |
| *A63F 13/285* | (2014.01) | |
| *A63F 13/211* | (2014.01) | |
| *A63F 13/235* | (2014.01) | |
| *A63F 13/212* | (2014.01) | |
| *H01F 7/08* | (2006.01) | |
| *F15B 15/10* | (2006.01) | |
| *A63F 13/92* | (2014.01) | |
| *G06T 19/00* | (2011.01) | |
| *A41D 1/00* | (2018.01) | |
| *A41D 19/00* | (2006.01) | |

(52) U.S. Cl.
CPC ............ *G06F 3/014* (2013.01); *A63F 13/211* (2014.09); *A63F 13/212* (2014.09); *A63F 13/235* (2014.09); *A63F 13/285* (2014.09); *A63F 13/92* (2014.09); *F15B 15/10* (2013.01); *G06F 3/016* (2013.01); *H01F 7/08* (2013.01); *A41D 1/002* (2013.01); *A41D 19/0027* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 5,516,249 A | * | 5/1996 | Brimhall | B25J 3/04 |
| | | | | 414/5 |
| 6,049,327 A | * | 4/2000 | Walker | G06F 3/014 |
| | | | | 345/158 |

(Continued)

FOREIGN PATENT DOCUMENTS

KR 10-2009-0064968 A 6/2009

OTHER PUBLICATIONS

International Search Report and Written Opinion of the International Searching Authority in International Application No. PCT/US2019/035732, dated Sep. 26, 2019.

*Primary Examiner* — David D Davis
(74) *Attorney, Agent, or Firm* — Medler Ferro Woodhouse & Mills PLLC

(57) ABSTRACT

A kinesthetically enabled glove for providing kinesthetic feedback to a user are provided. The kinesthetically enabled glove incorporates various actuators configured to provide resistance to movement and/or to provide movement. Kinesthetic actuators employed include electroadhesive actuators, electromagnetic actuators, air-jamming actuators, and inertial mass actuators. The kinesthetic actuators are arranged in various portions of the kinesthetically enabled glove to provide force feedback at different locations. The kinesthetic glove may be employed during interaction with a computer system, providing a user with a more immersive experience.

19 Claims, 12 Drawing Sheets

(56) References Cited

U.S. PATENT DOCUMENTS

| | | | | |
|---|---|---|---|---|
| 6,408,289 B1 * | 6/2002 | Daum | ............. | A61F 2/586 |
| | | | | 706/44 |
| 2001/0026264 A1 | 10/2001 | Rosenberg | | |
| 2002/0075232 A1 * | 6/2002 | Daum | ............. | G06F 3/014 |
| | | | | 345/158 |
| 2002/0178830 A1 * | 12/2002 | Kazerooni | ......... | B65G 43/00 |
| | | | | 73/760 |
| 2005/0114981 A1 * | 6/2005 | Shim | ............. | A41D 19/015 |
| | | | | 2/159 |
| 2006/0167564 A1 * | 7/2006 | Flaherty | ......... | A61B 5/0476 |
| | | | | 623/57 |
| 2012/0029399 A1 * | 2/2012 | Sankai | .......... | A61B 5/04888 |
| | | | | 601/40 |
| 2014/0134575 A1 * | 5/2014 | Kim | ............. | G09B 21/025 |
| | | | | 434/114 |
| 2014/0243721 A1 * | 8/2014 | Bryant | ........... | A61F 5/013 |
| | | | | 602/21 |
| 2016/0246369 A1 | 8/2016 | Osman | | |
| 2016/0342207 A1 * | 11/2016 | Beran | ............. | G06F 3/011 |
| 2016/0363997 A1 * | 12/2016 | Black | ............. | G06F 3/014 |
| 2017/0160807 A1 * | 6/2017 | Keller | ............ | G06F 3/016 |
| 2017/0168565 A1 * | 6/2017 | Cohen | ............ | B25J 13/025 |
| 2017/0269686 A1 | 9/2017 | Khoshkava et al. | | |
| 2017/0300115 A1 * | 10/2017 | Kerr | ............. | G06F 3/016 |
| 2018/0077976 A1 * | 3/2018 | Keller | ........... | A41D 1/005 |
| 2018/0081436 A1 * | 3/2018 | Keller | ........... | G06F 3/016 |
| 2018/0098583 A1 * | 4/2018 | Keller | ........... | A41D 19/0034 |
| 2018/0107277 A1 * | 4/2018 | Keller | ........... | G06F 3/014 |

* cited by examiner

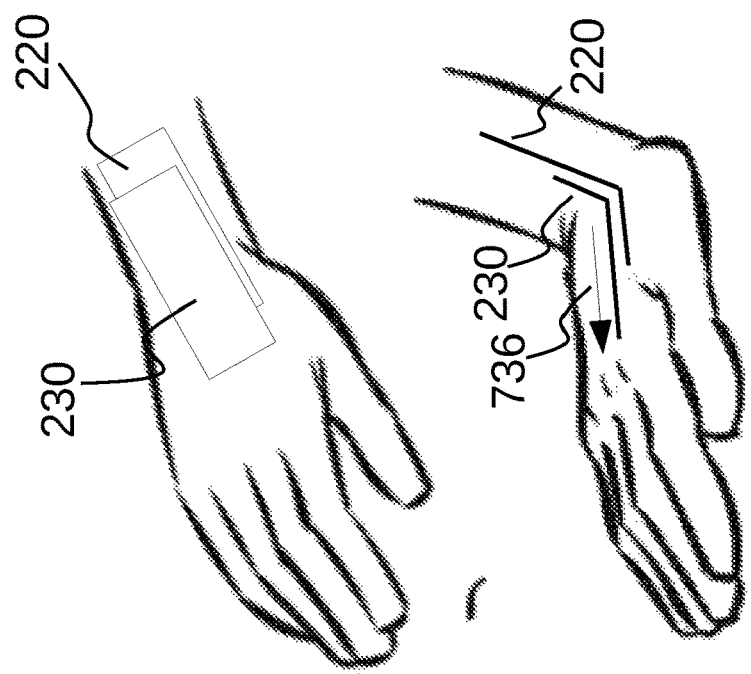
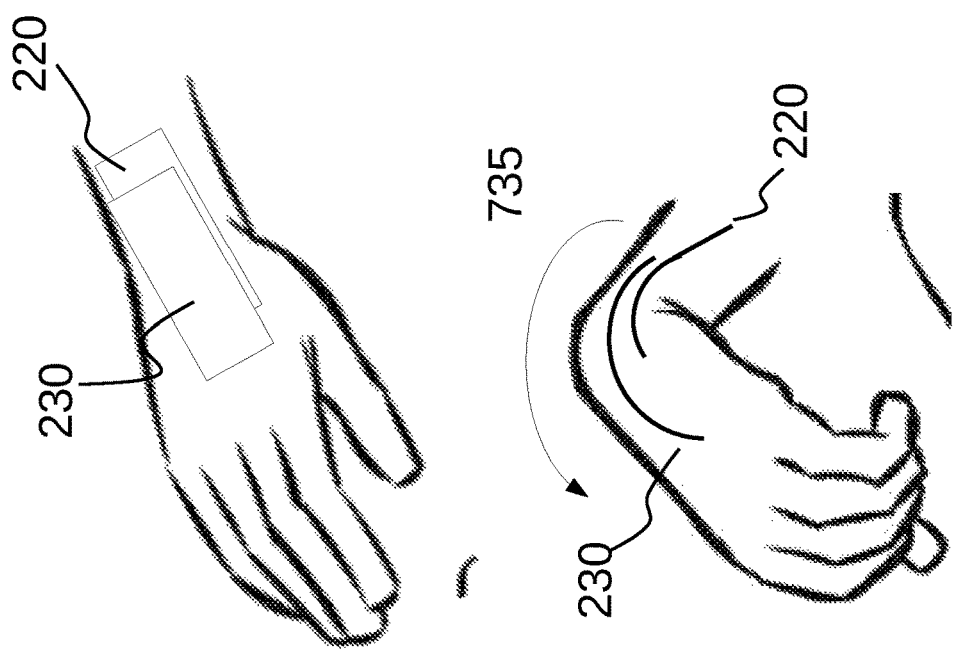
FIG. 7B
FIG. 7A

KINESTHETICALLY ENABLED GLOVE

FIELD OF THE INVENTION

Embodiments hereof relate to a kinesthetically enabled glove. In particular, embodiments hereof include a kinesthetically enabled glove, kinesthetic actuators associated therewith, and methods of actuating a kinesthetically enabled glove.

BACKGROUND OF THE INVENTION

The rising popularity of video games, virtual reality (VR), mixed reality (MR), and augmented reality (AR) systems has prompted users to seek ever more immersive experiences. Among such experiences are haptic and kinesthetic feedback, which engage user senses beyond the traditional audio and visual senses of a standard video game. Further, interacting with VR, MR, and AR environments through natural gestures and without the need for an explicit controller supplements the immersivity of the experience. Providing kinesthetic feedback in a system without a controller may be accomplished through kinesthetically enabled gloves. Conventional kinesthetically enabled gloves have required mechanical grounding to generate force feedback in the hand. To provide large mechanical forces, bulky and complex mechanisms have been required. Further, some conventional designs require the hands to grip or hold an object or device to transmit the force feedback.

Systems devices, and method consistent with embodiments described herein address these and other drawbacks that exist with conventional kinesthetically enabled gloves.

BRIEF SUMMARY OF THE INVENTION

Embodiments of the invention include a kinesthetically enabled glove. A kinesthetically enabled glove according to embodiments of the invention has kinesthetic actuators located in various portions of the glove to impart forces that either cause movement of or resist movement of the glove. In turn, a user wearing the glove experiences these forces either resisting movements of their hand or causing movements of their hand. When the kinesthetic actuators of the glove are selectively activated according to application content (e.g., VR, MR, AR, and/or traditional gaming), a user's immersive experience is greatly improved. As the user virtually interacts with objects and items within the application, the glove selectively provides force feedback to the user's hand in response to the content. Because kinesthetically enabled gloves according to embodiments herein can experience selective activation of different portions and are relatively compact and lightweight, the immersive experience is improved for the user.

In an embodiment, a wearable device for providing kinesthetic effects is provided. The wearable device includes a glove including five finger portions and a glove body and an actuator secured to the glove. The actuator is configured to receive a command signal indicative of a virtual interaction and provide a force, in response to the command signal, to execute at least one of a movement of the glove and a resistance to a movement of the glove.

In another embodiment, a method of providing kinesthetic feedback in a wearable device having a glove including five finger portions and a glove body is provided. The method includes receiving a command signal at an actuator secured to the glove and providing a force to execute at least one of a movement of the glove and a resistance to a movement of the glove in response to the command signal.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIGS. 7A and 7B illustrate motion of an electroadhesive actuator during hand movement.

DETAILED DESCRIPTION OF THE INVENTION

Figure 1:
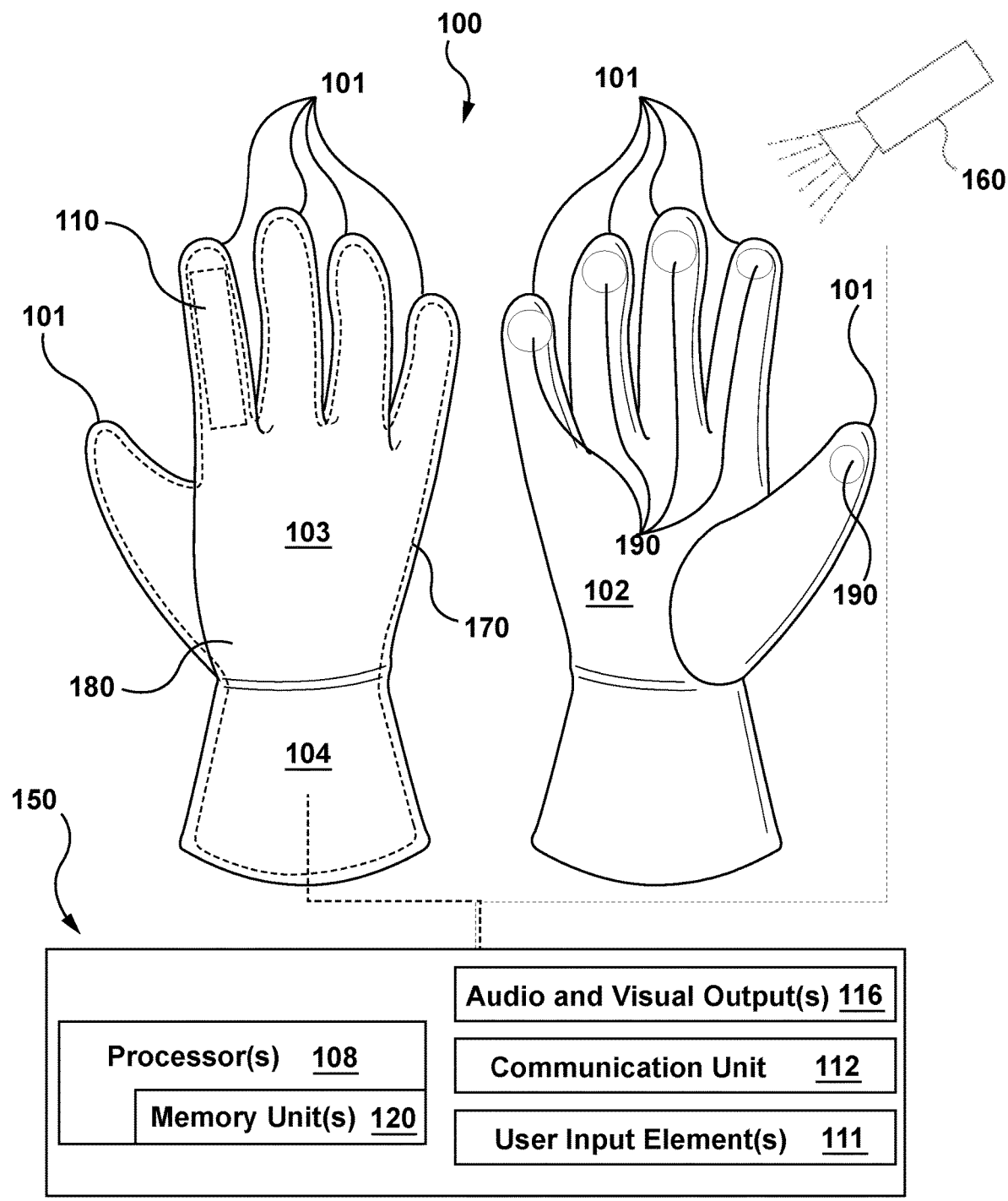
FIG. 1 illustrates a pair of kinesthetically enabled gloves according to an embodiment.

Specific embodiments of the present invention are now described with reference to the figures. The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the present invention are directed to kinesthetic actuators configured to provide ungrounded force feedback to a user of a wearable device. The kinesthetic actuators are ungrounded in the sense that they do not require a connection to a device or structure other than the wearable device. Exemplary embodiments of kinesthetic actuators are described herein with respect to a kinesthetically enabled glove configured to provide kinesthetic and force feedback effects. Description of non-limiting examples related to a kinesthetically enabled glove is provided. It is understood that kinesthetic force feedback devices, as discussed herein, may equally be applied to other wearable devices, including pants, shirts, socks, shoes, jackets, belts, and portions thereof, e.g., sleeves, legs, etc.

A kinesthetically enabled glove in accordance with embodiments includes an actuator(s) arranged to provide movement or resist movement of a glove and a user's hand within the glove. According to embodiments hereof, one or more actuators may be arranged within the finger portions, dorsal portion, and/or wrist portion of the glove to provide resistance to bending movements of the hand within the glove. In further embodiments, the one or more actuators may be arranged to provide a force on the glove to cause movement of the hand within the glove. The one or more actuators may be selectively actuated to provide resistance and/or movement in accordance with commands from an application running on a computer system, such as a VR, AR, and MR environments.

Embodiments described herein relate to devices and systems that include kinesthetically enabled glove(s) configured for connection with a computer system having a display device. Computer systems consistent with the present invention may be configured as a gaming console, a handheld gaming device, a personal computer (e.g., a desktop computer, a laptop computer, etc.), a smartphone, a tablet computing device, a television, an interactive sign, and/or other device that can be programmed to provide a haptic control signal. Such computer systems may include one or more processors (also interchangeably referred to herein as processors, processor(s), or processor for convenience), one or more memory units, audio and visual outputs, user input elements, a communication unit or units, and/or other components. Computer system processors may be programmed by one or more computer program instructions to carry out methods described herein. Communication units consistent with the present invention may include any connection device, wired or wireless, that may transmit or communicate with peripheral devices, including a kinesthetically enabled glove(s).

FIG. 1 illustrates palmar and dorsal views of a kinesthetically enabled glove 100 according to an embodiment. The kinesthetically enabled glove 100 includes an inner body 170 and a glove body 180. The glove body 180 forms the exterior of the kinesthetically enabled glove 100. The inner body 170 forms an interior of the kinesthetically enabled glove 100 and is configured to contact the hand of a user. As illustrated in FIG. 1, the inner body 170 is a separate glove shaped portion secured to the glove body 180, and may be a glove liner. In alternative embodiments, the inner body 170 may form only a portion of a glove shape, and may include, for example, finger segments but no palm covering, or a palm covering but no finger segments. In further embodiments, the inner body 170 may comprise an interior surface of the glove body 180.

The kinesthetically enabled glove 100 includes five finger portions 101, a palmar portion 102, a dorsal portion 103, and a wrist portion 104. The kinesthetically enabled glove 100 may be provided as a pair, and similarly operated as a pair of kinesthetically enabled gloves. The kinesthetically enabled glove 100 further includes one or more actuator(s) 110. The actuator 110 is configured to receive a command signal. In response to the command signal, the actuator 110 provides a force to either resist movement of the glove or cause movement of the glove. As illustrated in FIG. 1, the actuator 110 may be provided in a finger portion 101 of the kinesthetically enabled glove 100. In alternative embodiments, the actuator(s) 110 may be provided in any or all of the finger portions 101, as well as in the palmar portion 102, the dorsal portion 103, and/or the wrist portion 104.

In accordance with embodiments hereof, the kinesthetically enabled glove 100 includes position trackers 190. As illustrated in FIG. 1, position trackers 190 may be located on each of the finger portions 101 to track the location of that specific finger. In other examples, position trackers 190 may be located in other portions of the kinesthetically enabled glove 100. Position trackers 190 may include active or passive tracking devices. For example, position trackers 190 may include actively powered tracking devices such as inertial sensors, e.g. accelerometers, and other tracking devices configured for active tracking of location. Position trackers 190 may also include passive tracking devices, such as RFID sensors, that may be tracked by external devices. Position trackers 190 may further include visual markers for tracking by an external camera. According to some embodiments, a kinesthetically enabled glove 100 is provided without position trackers 190, and position sensing of the kinesthetically enabled glove 100 is accomplished entirely via the use of external devices, such as camera, radar, ultrasound, etc.

A wearer interacting with a system, for example, a VR, AR, MR system, or conventional display system, may wear the kinesthetically enabled glove(s) 100 to improve the immersive experience. The kinesthetically enabled glove 100 is configured to provide force feedback to the wearer of the glove, providing resistance to make it difficult to move the hand inside the kinesthetically enabled glove 100 and/or providing force to cause movement of the hand inside the kinesthetically enabled glove 100. The kinesthetically enabled glove 100 is configured with at least one actuator 110 and may include an actuator located in any combination of the five finger portions 101, the palmar portion 102, the dorsal portion 103, and the wrist portion 104. Actuators 110 located in the finger portions 101, for example, provide a force that moves or resists movement the user's fingers. Actuators 110 located in the palmar portion 102 provide a force that moves or resists movement of the palmar area of the hand, e.g., when grasping an object. Actuators 110 located in the dorsal portion 103 and/or the wrist portion 104 are configured to provide a force that moves or resists movement of the user's wrist, e.g., when rotating the hand.

The kinesthetically enabled glove 100 may be employed with a computer system 150 having one or more processors. The computer system 150 may include one or more processors 108 (also interchangeably referred to herein as processors 108, processor(s) 108, or processor 108 for convenience), one or more memory unit(s) 120, communication unit 112, user input element(s) 111, audio and visual output(s) 116, and/or other components. The processors 108 may be programmed by one or more computer program instruction stored in the memory unit(s) 120. The functionality of the processor 108, as described herein, may be implemented by software stored in the memory unit(s) 120 or another non-transitory computer-readable or tangible medium, and executed by the processor 108. As used herein, for convenience, the various instructions may be described as performing an operation, when, in fact, the various instructions program the processors 108 to perform the operation. In other embodiments, the functionality of the processor may be performed by hardware (e.g., through the use of an application specific integrated circuit ("ASIC"), a programmable gate array ("PGA"), a field programmable gate array ("FPGA"), etc.), or any combination of hardware and software.

The various instructions described herein may be stored in the memory unit(s) 120, which may comprise random access memory (RAM), read only memory (ROM), flash memory, and/or any other memory suitable for storing software instructions. The memory unit(s) 120 may store the computer program instructions (e.g., the aforementioned instructions) to be executed by the processor 108 as well as data that may be manipulated by the processor 108.

The user input elements 111 may include any elements suitable for accepting user input. These may include buttons, switches, dials, levers, touchscreens, and the like. User input elements 111 may further include peripherally connected devices, such as mice, joysticks, game controllers, keyboards, and the like. According to embodiments hereof, the kinesthetically enabled glove 100 may function as a user input element 111, for example, through position trackers 190 within the glove and/or one or more camera(s) used to track movement of the glove.

The communication unit 112 includes one or more devices or components configured for external communication. The communication unit 112 is configured for communication with the kinesthetically enabled glove 100 and the actuator(s) 110 located therein. The communication unit may include wired communication ports, such as USB ports, HDMI® ports, A/V ports, optical cable ports, and any other component or device configured to receive or send information in a wired fashion. The communication unit may further include wireless communication devices, such as BLUETOOTH® antennas, WI-FI® antennas, cellular antennas, infrared sensors, optical sensors, and any other device configured to receive and/or transmit information wirelessly.

The processor 108 is configured to provide a command signal to one or more of the kinesthetic actuators in the kinesthetically enabled glove 100. The command signal may be provided in response to, in association with, or otherwise due to occurrences or actions in a computer application. The command signal may be provided in response to a virtual interaction in a VR, AR, or MR environment.

In a system making use of a kinesthetically enabled glove 100, a camera 160 may be employed to track motion of a user's hand or other body parts. In embodiments, the camera 160 is located on the kinesthetically enabled glove 100. In additional embodiments, the camera 160 is located in an off-hand position, e.g, remote from the kinesthetically enabled glove 100, such as on a wearable device of the user or on a stationary mounting. The camera 160 communicates with the processor 108 of the computer system 150, based on wired or wireless transmissions. The camera 160 tracks the motion of the user's hand or other body parts and thus permits the user to interact with a computer application, such as a VR, AR, or MR environment. Kinesthetic feedback provided via the kinesthetically enabled glove 100 is provided in response to tracked motions of the user's hand or other body parts. The feedback may be closed-loop feedback provided in response to virtual interactions detected via the camera 160 and/or may be provided in response to any other interaction that a user may have with the computer system 150, as tracked and identified by the camera 160.

Figure 2:
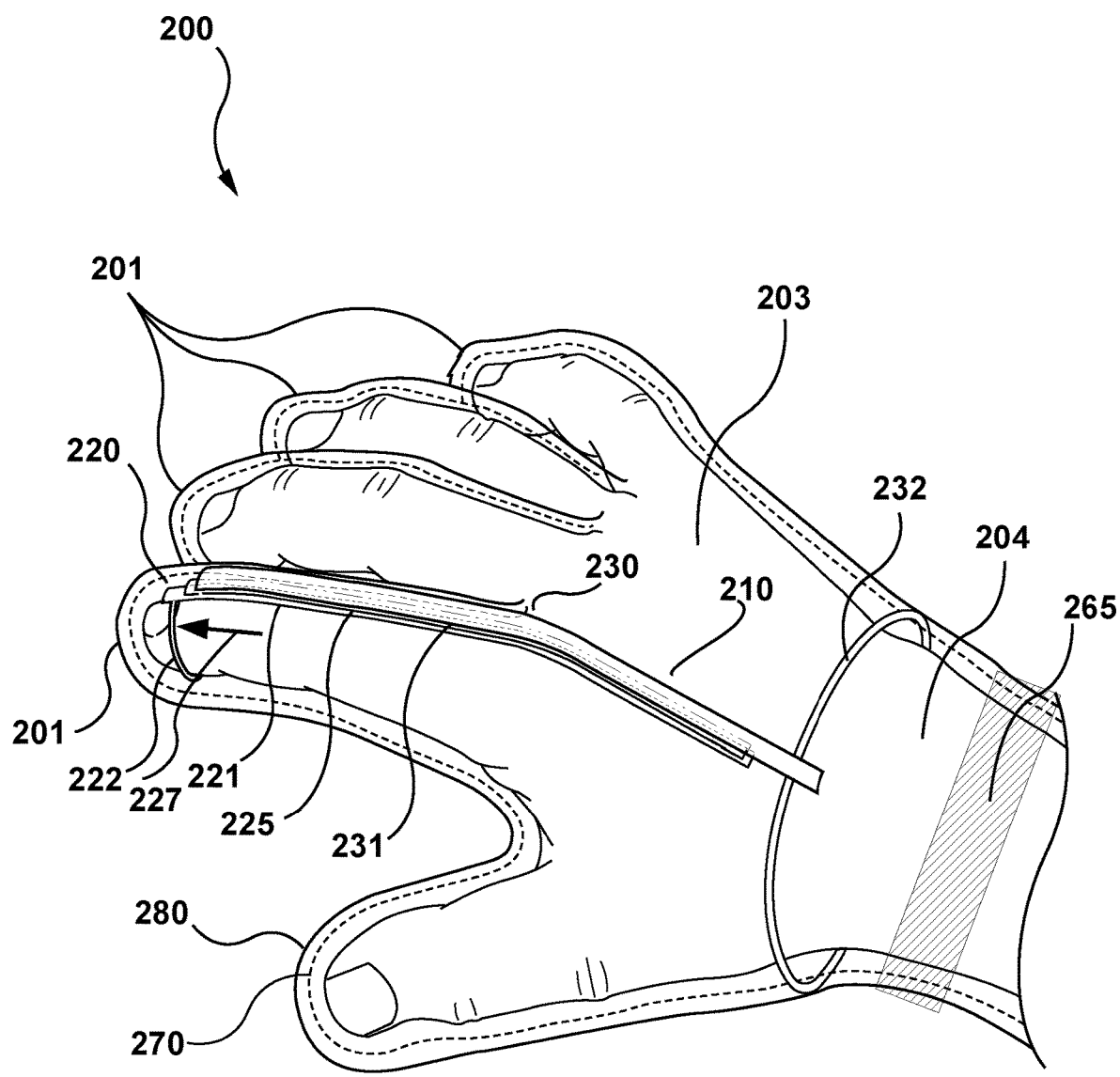
FIG. 2 illustrates an electroadhesive actuator for a kinesthetically enabled glove according to an embodiment.

FIG. 2 illustrates an electroadhesive actuation mechanism for kinesthetically enabled gloves according to an embodiment. A kinesthetically enabled glove 200 of FIG. 2 includes a glove body 280 and an inner body 270, similar to those discussed above with respect to the kinesthetically enabled glove 100. The kinesthetically enabled glove 200 further includes finger portions 201, a palmar portion (not shown), a dorsal portion 203, and a wrist portion 204. The kinesthetically enabled glove 200 may include any or all of the features discussed above with respect to kinesthetically enabled glove 100, and may be configured to interact with a computer system 150 and a camera 160 similarly to kinesthetically enabled glove 100. In FIG. 2, the kinesthetically enabled glove 200 includes an electroadhesive actuator 210 disposed within a finger portion 201. One or more electroadhesive actuators 210 may be included in any number of the finger portions 201 or other areas of the kinesthetically enabled glove 200. The electroadhesive actuator 210 of the kinesthetically enabled glove 200 operate via the generation of electroadhesive force. Electroadhesive actuation functions by creating an attraction, i.e., an electroadhesive force, when surfaces, e.g., surfaces of electroadhesive electrodes, located proximal or adjacent to one another are energized with an electric field. The electroadhesive electrodes include conductive electrodes secured to a substrate and arranged in an alternating pattern between positive and negative electrodes. When energized, i.e., supplied with power, the electroadhesive electrodes exhibit an attraction towards one another, and thus resist relative movement. This type of attraction is particularly efficacious when the relative movement is shear movement, as sliding the surfaces with respect to one another keeps them in proximity to and/or contact with each other, allowing the electroadhesive force to be maintained there between.

As illustrated in FIG. 2, the inner body 270 is a separate glove shaped portion secured to the glove body 280, such as a glove liner. In alternative embodiments, the inner body 270 may form only a portion of a glove shape, and may include, for example, finger segments but no palm covering, or a palm covering but no finger segments. In further embodiments, the inner body 270 may comprise an interior surface of the glove body 280.

Although FIG. 2 illustrates a single electroadhesive actuator 210 integrated into a finger portion 201, multiple similar electroadhesive actuators 210 may be integrated into the kinesthetically enabled glove 200 in different locations. For instance, an electroadhesive actuator 210, operating in the kinesthetically enabled glove 200, may be integrated into each of the finger portions 201, and/or may be included in one or more of the palmar portion (not shown), dorsal portion 203, and/or wrist portion 204.

The electroadhesive actuator 210 is integrated into the kinesthetically enabled glove 200. The electroadhesive actuator 210 includes an inner portion 220 and an outer portion 230 configured for attraction to one another when activated. The inner portion 220 includes at least an inner electrode 221 and is configured to contact a finger of the wearer via inner securement 222. The outer portion 230 includes at least an outer electrode 231 and is secured to the glove body 280 of the kinesthetically enabled glove 200 via outer securement 232, for example, at a dorsal portion 203 or a wrist portion 204. The inner electrode 221 and the outer electrode 231 are electroadhesive electrodes. An insulation layer 225 is included in the electroadhesive actuator 210 between the inner electrode 221 of the inner portion 220 and the outer electrode 231 of the outer portion 230. The insulation layer 225 prevents the electrodes from shorting against one another. The insulation layer 225 may be secured to the inner electrode 221 or to the outer electrode 231 or to neither electrode. The kinesthetically enabled glove 200 is secured to the user via a glove securement portion 265. The glove securement portion 265 may include, for example, a strap securable by Velcro™, one or more ties, one or more clasps, or other means for tightening and securing the glove in place on the user's arm or wrist. In further embodiments, the glove securement portion 265 may be provided at any location within or attached to the kinesthetically enabled glove 200 to secure to the kinesthetically enabled glove 200 to the user's wrist or hand.

As illustrated in FIG. 2, the inner portion 220 includes inner electrode 221 and inner securement 222, while the outer portion 230 includes the outer electrode 231 and the outer securement 232. The inner portion 220 and the outer portion 230 are arranged relative to one another such that the inner electrode 221 and the outer electrode 231 are located adjacent one another. The inner portion 220 and the outer portion 230 may be strips extending adjacent to one another along the length of the finger portion 201 of the kinesthetically enabled glove 200. The inner securement 222 is a band configured for securement to a user's finger. In further embodiments, the inner securement 222 is cup shaped or tube shaped for securing to the user's finger. The outer securement 232 is a band configured to secure the outer electrode 231 to the kinesthetically enabled glove 200. In alternative embodiments, the outer securement 232 may include stitches, adhesives, and/or other structures that secure the outer electrode 231 to the kinesthetically enabled glove 200. The outer securement 232 may serve as a securement for outer electrodes 231 of multiple electroadhesive actuators 210 arranged in multiple finger portions 201. The inner portion 220 and the outer portion 230 may further include supporting structural materials to which the inner electrode 221 and the outer electrode 231 are secured. Such material portions may include strips of material and/or tubes of material, such as cloth, rubber, plastic, etc. For example, each of the inner portion 220 and the outer portion 230 may include a supporting structural material secured, respectively, to the inner body 270 and the glove body 280. The inner electrode 221 and the outer electrode 231 may be secured to the respective supporting structural material of the inner portion 220 and the outer portion 230.

According to embodiments hereof, the inner portion 220 may be comprised of a part of or may be coupled to the inner body 270 and the outer portion 230 may be comprised of a part of or may be coupled to the glove body 280. A finger area of the inner body 270 may function as the inner portion 220 of the electroadhesive actuator 210 and may have the inner electrode 221 secured thereto. The inner securement 222 may be formed from a fingertip of the inner body 270. A finger portion 201 of the glove body 280 may function as the outer portion 230 of the electroadhesive actuator 210 and may thus have the outer electrode 231 secured thereto. The inner electrode 221 and the outer electrode 231 may be secured to the inner body 270 and glove body 280, respectively, via stitches, adhesives, fabric portions, or any other suitable means.

When the electroadhesive actuator 210 is inactive, and no electrical field is provided to the inner electrode 221 and outer electrode 231, the inner portion 220 and the outer portion 230 are free to slide with respect to each other as the user flexes and moves their fingers and/or hand with the kinesthetically enabled glove 200. When the user bends a finger, the inner portion 220 moves forward relative to the outer portion 230 in the direction of arrow 227, while the outer portion 230 undergoes little or no movement. When the electroadhesive actuator 210 is activated, an electroadhesive force is generated between the inner electrode 221 and the outer electrode 231. The electroadhesive force creates a resistance to the free movement of the inner portion 220 and the outer portion 230 of the electroadhesive actuator 210 with respect to one another. The electroadhesive force serves to bias the inner electrode 221 and the outer electrode 231 against relative movement. The glove securement portion 265 secures the wrist portion 204 of the kinesthetically enabled glove 200 to the user's wrist. The resistance to free movement caused by the electroadhesive force makes it more difficult for a user to apply a bending movement to the finger portion 201. When the user bends the finger portion 201, the wrist portion 204 of the kinesthetically enabled glove 200 is not pulled towards the finger portion 201 because it is secured via the glove securement portion 265.

The electroadhesive effect may be selectively applied to one or more electroadhesive actuators 210 located in the kinesthetically enabled glove 200 and applied at varying strength levels, and thus may provide a variable resistance to bending in the finger portions 201. An electroadhesive actuator 210 including an inner portion 220 with an inner electrode 221 and an inner securement 222, outer portion 230 with an outer electrode 231 and an outer securement 232, and an insulation layer 225, may similarly be located in each of the other finger portions 201 of the kinesthetically enabled glove 200. As illustrated in FIG. 2, the outer portion 230 is secured to the kinesthetically enabled glove 200 at the wrist portion 204. In this embodiment, the length of the actuator 210 extends from the wrist portion 204 to the tip of the finger portion 201.

The electroadhesive actuator 210 is illustrated in FIG. 2 as including a pair of long and narrow electrode strips, extending between the tips of a finger portion 201 and the wrist portion 204. The electroadhesive actuator 210, and other electroadhesive actuators according to embodiments of the invention, are not limited to such a form factor. An electroadhesive actuator 210 may be provided in alternative form factors, as described below with respect to FIGS. 3-6.

Figure 3:
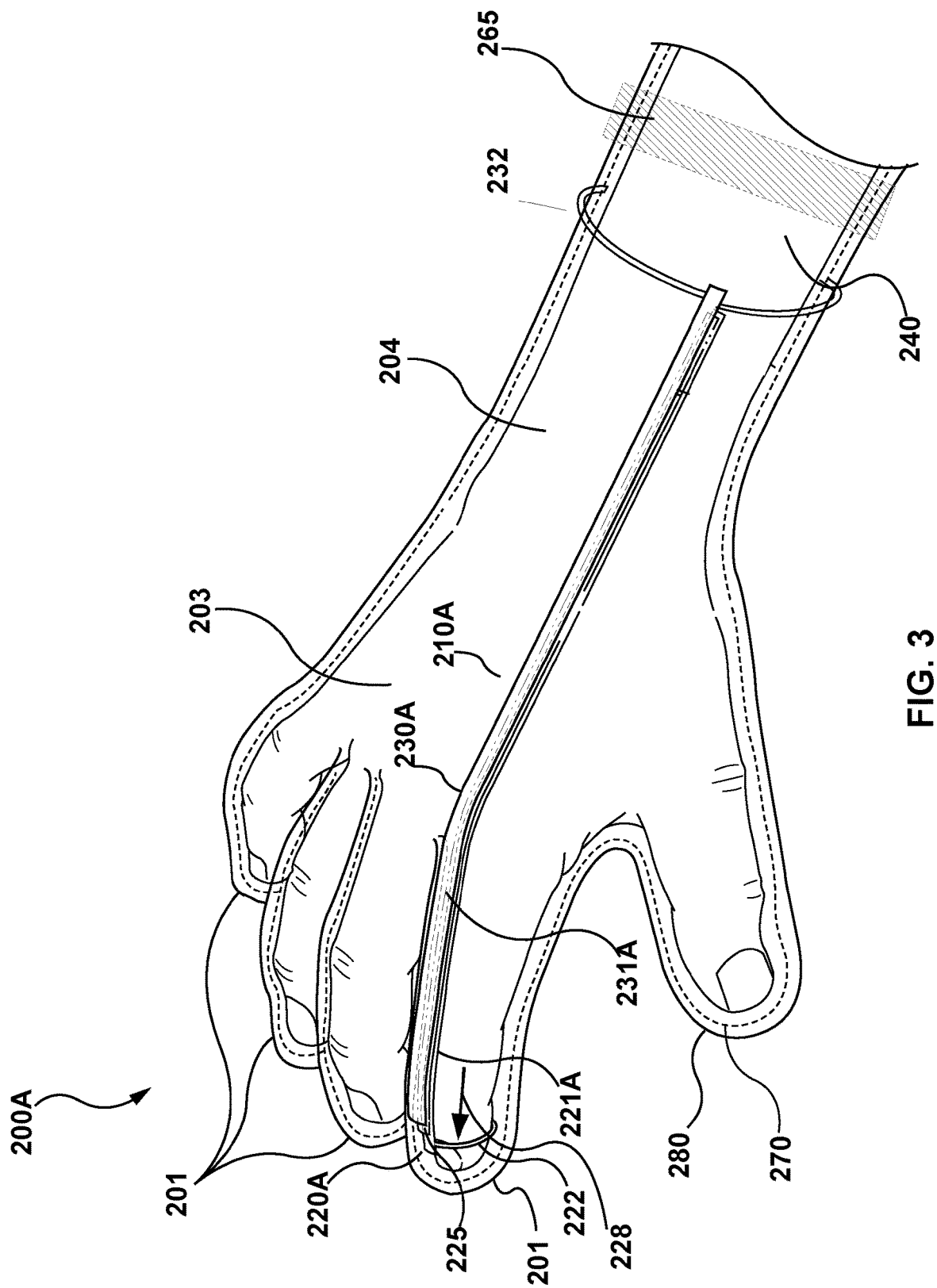
FIG. 3 illustrates an electroadhesive actuator for a kinesthetically enabled glove according to an embodiment.

FIG. 3 illustrates a kinesthetically enabled glove 200A including an electroadhesive actuator 210A according to embodiments hereof. In the embodiment of FIG. 3, an outer portion 230A of the electroadhesive actuator 210A includes an outer electrode 231A and an outer securement 232 and is secured to the kinesthetically enabled glove 200A via the outer securement 232 at a position extending up the arm of the user. For example, the kinesthetically enabled glove 200A may include an extension portion 240 configured to extend past the wrist of the wearer. The extension portion 240 may be an extended cuff or a sleeve that extends up the user's arm. The extension portion 240 is secured to the user via the glove securement portion 265. As described with respect to FIG. 2, the glove securement portion 265 may include various structures and materials and may be located anywhere within or attached to the kinesthetically enabled glove 200A. An inner portion 220A of the electroadhesive actuator 210A includes an inner electrode 221A and an inner securement 222. The inner portion 220A of the electroadhesive actuator 210A is configured for contact with a finger of the user via the inner securement 222. The outer portion 230A may be secured to the extension portion 240 and the inner portion 220A may extend along the outer portion 230A into the extension portion 240. Because each of the inner portion 220A and the outer portion 230A are longer than the inner portion 220 and the outer portion 230 of the embodiment of FIG. 2, this embodiment increases the surface area between the inner portion 220A and the outer portion 230A of the electroadhesive actuator 210A. In embodiments, the width of an inner portion and an outer portion may also be increased. The increased surface area permits the generation of increased attraction force between the inner portion 220A and the outer portion 230A of the electroadhesive actuator 210A, which allows the kinesthetically enabled glove 200A to impart greater resistance to a bending movement.

As discussed above with respect to electroadhesive actuator 210 and kinesthetically enabled glove 200, in embodiments of the kinesthetically enabled glove 200A the inner portion 220A of the electroadhesive actuator 210A may include a section of the inner body 270 to which the inner electrode 221A is secured. The outer portion 230A of the electroadhesive actuator 210A may include a section of the glove body 280 to which the outer electrode 231A is secured. The inner electrode 221A and the outer electrode 231A may be secured to the inner body 270 and glove body 280, respectively, via stitches, adhesives, fabric portions, or any other suitable means. The inner securement 222 may include a band, a fabric cup, a tube, or any other suitable means of securing the inner portion 220A to the user's finger. The outer securement 232 may include a band, stitching, adhesives, or any other suitable means of securing the outer portion 230A to the glove body 280.

The operation of the kinesthetically enabled glove 200A is similar to that of the kinesthetically enabled glove 200. When not activated, the electroadhesive actuator 210A provides no active resistance to movement of the finger portion 201 in which it is located. Bending of the finger by the user causes relative movement of the inner portion 220 with respect to the outer portion 230A in the direction indicated by arrow 228. The relative movement is resisted by force generated by the electroadhesive attraction between the inner electrode 221A and the outer electrode 231A when the electroadhesive actuator 210A is actuated via a command signal. Because the extension portion 240 is secured to the user's arm via the glove securement portion 265, the outer securement 232 does not pull the extension portion 240 of the kinesthetically enabled glove 200A towards the fingers.

Figure 4:
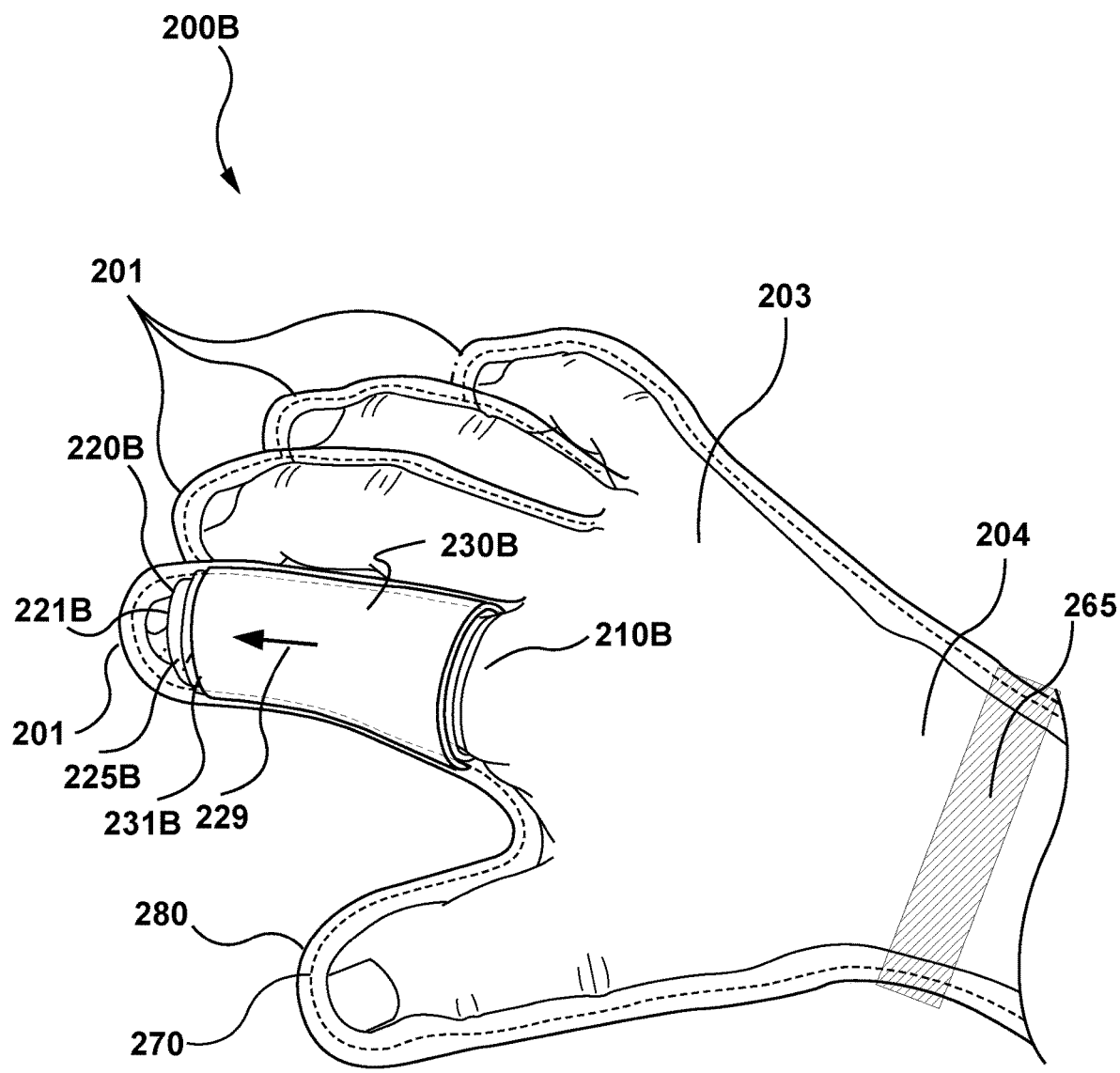
FIG. 4 illustrates an electroadhesive actuator for a kinesthetically enabled glove according to an embodiment.

FIG. 4 illustrates a kinesthetically enabled glove 200B including an electroadhesive actuator 210B according to an embodiment. In the embodiment of FIG. 4, an inner portion 220B and an outer portion 230B of the electroadhesive actuator 210B are concentric tubes separated by an insulation layer 225B. The inner portion 220B includes at least an inner electrode 221B and may include a material portion to which the inner electrode 221B is secured. The outer portion 230B includes at least an outer electrode 231B and may include a material portion to which the outer electrode 231B is secured. Further structural details of the inner portion 220B and the outer portion 230B of the electroadhesive actuator 210B are provided below with respect to FIG. 5. The inner portion 220B and the outer portion 230B form concentric tubes, as do the electrode 221B and the outer electrode 231B. Disposing the inner electrode 221B and the outer electrode 231B concentrically permits a greater surface area between the electrodes, and thus allows for greater resistance to a bending movement of a finger positioned within the finger portion 201. As illustrated in FIG. 4, the outer portion 230B is secured to the finger portion 201 of the glove body 280. The inner portion 220B is configured for contact with a user's finger. As illustrated in FIG. 4, the inner portion 220B is configured to surround or wrap around the user's finger and contact the finger at multiple locations around the circumference. In an embodiment, the inner portion 220B makes continuous circumferential contact with the user's finger.

In further embodiments, the outer portion 230B may be secured to the wrist portion 204 of the kinesthetically enabled glove 200B or may be secured to an extension portion 240 similar to that discussed above with respect to FIG. 3. In such embodiments, the inner electrode 221B and the outer electrode 231B may form concentric tubes for only a portion of their length and may form parallel strips disposed in parallel with one another for the length between the end of the finger portion 201 and the point on the wrist portion 204 or extension portion 240 to which the outer portion 230B is secured. The insulation layer 225 may similarly extend from the finger portion 201, across the dorsal portion 203, to the point at which the outer portion 230B is secured at the wrist portion 204 or the extension portion 240. The glove securement portion 265 is provided at the wrist portion 204 to secure the kinesthetically enabled glove 200B to the hand of the user. As described with respect to FIG. 2, in embodiments, the glove securement portion 265 may include various structures and materials and may be located anywhere within or attached to the kinesthetically enabled glove 200B.

According to embodiments hereof, the inner portion 220B may form a tube closed at the end, thus permitting the fingertip to contact the inner portion 220B at the closed end. In further embodiments, the concentric tubes formed by the inner portion 220B and the outer portion 230B may be configured to incompletely surround the finger. The inner portion 220B and the outer portion 230B may be configured to extend around the finger as any portion of an approximately circular tube, which may range from a completely circular cross-section, through a semi-circular cross-section, to a cross-section having less than 5 degrees of arc.

According to embodiments hereof, the inner portion 220B and the outer portion 230B of the electroadhesive actuator 210B may be secured to and/or may be a part of an inner body 270 and a glove body 280, respectively of the kinesthetically enabled glove 200B. Thus, for example, the inner body 270 embodied as a glove liner of the kinesthetically enabled glove 200B may have the inner electrode 221B secured circumferentially around each finger segment and the glove body 280 may have the outer electrode 231B secured circumferentially within each finger portion 201. The insulation layer 225B may be arranged circumferentially between the inner electrode 221B and the outer electrode 231B in such an arrangement. The insulation layer may be secured to the inner electrode 221B, the outer electrode 231B, or neither.

The operation of the kinesthetically enabled glove 200B is similar to that of the kinesthetically enabled glove 200. When not activated, the electroadhesive actuator 210B provides no active resistance to movement of the finger portion 201 in which it is located. Bending of the finger by the user causes relative movement of the inner portion 220B with respect to the outer portion 230B in the direction indicated by arrow 229. The relative movement is resisted by force generated by the electroadhesive attraction between the inner electrode 221B and the outer electrode 231B when the electroadhesive actuator 210A is actuated via a command signal. The glove securement portion 265 serves to secure the kinesthetically enabled glove 200B to the user's hand to prevent glove movement.

Figure 5A:
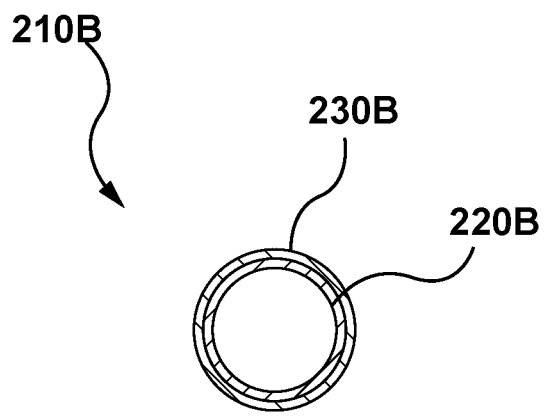
FIGS. 5A-5C illustrate details of an electroadhesive actuator according to an embodiment.
Figure 5B:
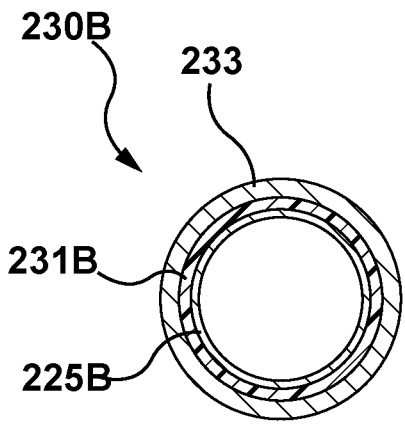
Figure 5C:
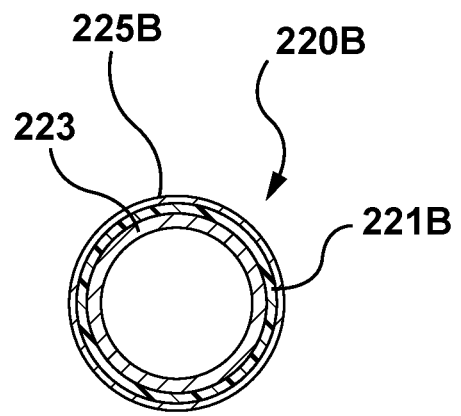

FIGS. 5A-5C are various cross-sectional views of the electroadhesive actuator 210B of FIG. 4, according to an embodiment. As illustrated in FIG. 5A, the electroadhesive actuator 210B may be formed of concentric tubes with the outer portion 230B being an outer tube and the inner portion 220B being an inner tube. FIG. 5B is a cross-sectional view of the outer portion 230B separated from a remainder of the electrostatic actuator 210B. As illustrated in FIG. 5B, the outer portion 230B includes an outer electrode 231B, an outer tube 233, and, optionally, an insulation layer 225B which may be attached to the outer electrode 231B. FIG. 5C is a cross-sectional view of the inner portion 220B separated from a remainder of the electrostatic actuator 210B. As illustrated in FIG. 5C, the inner portion 220B includes an inner electrode 221B, an inner tube 223, and, optionally, an insulation layer 225B, which may be attached to the inner electrode 221B. The insulation layer 225B may be included with either the inner portion 221B or the outer portion 231B, or both. The outer tube 233 may be formed by a segment of a finger portion 201 of the glove body 280 or may be a separate structure secured to the glove body 280. The inner tube 223 may be formed by a segment of the inner body 270 or may be a separate structure secured to the inner body 270.

Figure 6:
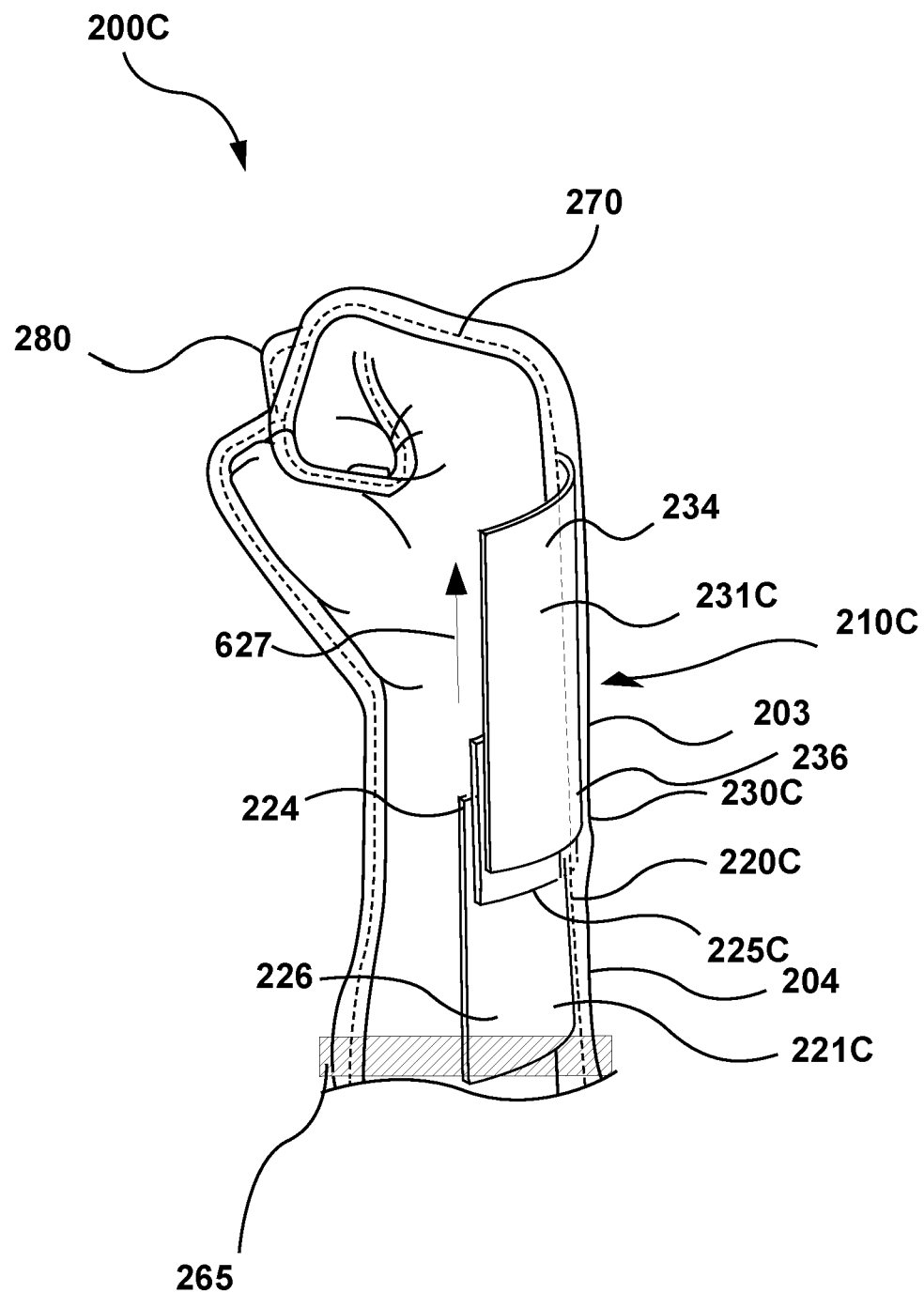
FIG. 6 illustrates an electroadhesive actuator for a kinesthetically enabled glove according to an embodiment.

FIG. 6 illustrates an electroadhesive actuator 210C for kinesthetically enabled gloves according to an embodiment. In the embodiment of FIG. 6, the electroadhesive actuator 210C is located in a dorsal portion 203 and a wrist portion 204 of a kinesthetically enabled glove 200C. An outer portion 230C of the electroadhesive actuator 210C is secured to the kinesthetically enabled glove. As discussed with reference to the embodiments above, the outer portion 230C may be integral with a glove body 280. An inner portion 220C of the electroadhesive actuator 210C is configured for contact with the hand, wrist area or arm of a user, and is located at the dorsal portion 203 and/or wrist portion 204 of the kinesthetically enabled glove. The inner portion 220C is configured to be secured to the hand, wrist area or arm of the user through the contact. The inner portion 220C may be integral with or secured to the inner body 270. The inner portion 220C includes an inner electrode 221C located adjacent to an outer electrode 231C of the outer portion 230C, with an insulation layer 225C located there between. The inner electrode 221C and the outer electrode 231C are broad flat electroadhesive electrodes and are arranged such that at least a portion of one is adjacent to at least a portion of the other, with the insulation layer 225C located between.

The inner and outer portions 220C, 230C respectively include distal ends 224, 234, respectively, located on ends closest to the finger portions 201 of the kinesthetically enabled glove 200C and proximal ends 226, 236, respectively, located on ends closest to the dorsal portion 203 of the kinesthetically enabled glove 200C. The inner portion 220C is configured to contact the hand of the user, while the outer portion 230C is configured to be anchored to the glove body 280. The inner portion 220C contacts the hand of the user at an opposite end of the kinesthetic actuator 210C from the securement of the outer portion 230C to the glove body 280. The proximal end 226 of the inner portion 220C may contact the hand and be anchored to the inner layer 270 near the wrist portion 204 of the kinesthetically enabled glove 200C, while the distal end 234 of the outer portion 230C is anchored to the glove body 280 near the dorsal portion 203 of the kinesthetically enabled glove 200C. The glove securement portion 265 is provided at the wrist portion 204 to secure the kinesthetically enabled glove 200C to the hand of the user. As described with respect to FIG. 2, in embodiments, the glove securement portion 265 may include various structures and materials and may be located anywhere within or attached to the kinesthetically enabled glove 200C.

To facilitate relative movement when the hand bends at the wrist, the secured distal end 234 of the outer portion 230C and the proximal end 226 of the inner portion 220C are longitudinally separated and located on opposite sides of the wrist joint. In alternative embodiments, the inner portion 220C and the outer portion 230C may be secured instead at the proximal end 224 and the distal end 236, respectively.

When the electroadhesive actuator 210C is not activated, the user may move a hand freely within the glove, and the inner portion 220C and the outer portion 230C may move against or relative to each other with no electroadhesive resistance. As the hand bends forward at the wrist, the outer portion 230C moves forward with the hand relative to the inner portion 230C in the direction of arrow 627. As the hand bends backwards at the wrist, the outer portion is also pulled away from the inner portion 230C in the direction of the arrow 627.

When the electroadhesive actuator 210C is activated, the attraction between the inner portion 220C and the outer portion 230C provided by inner electrode 221C and outer electrode 231C provide resistance to the bending movement of the user's hand, as illustrated in FIGS. 7A and 7B. FIGS. 7A and 7B illustrate hands of a user along with the inner portion 220C and the outer portion 230C in isolation. The glove securement portion 265 serves to anchor the kinesthetically enabled glove 200C to the user's hand to prevent glove movement during bending.

For example, as illustrated in FIG. 7A, bending the hand forward at the wrist causes the outer portion 230C to move forward, or distally, relative to inner portion 220C in the direction of arrow 735. As the hand is bent forward or downward at the wrist, the electroadhesive actuator 210C extends, stretches or increases in length, pulling the inner portion 220C, secured at wrist, away from the outer portion 230C, secured at the back of the hand. When the electroadhesive actuator 210C is activated, the attraction between the inner portion 220C and the outer portion 230C creates resistance to shearing movement between the portions, and thus creates resistance to the forward or downward bending of the hand at the wrist. In another example, as illustrated in FIG. 7B, as the hand is bent backward or upward at the wrist, the electroadhesive actuator 210C compresses or decreases in length, pushing the inner portion 220C, secured at wrist, toward the outer portion 230C, secured at the back of the hand. Stated another way, the outer portion 230C, secured to the hand, is pushed in the direction of arrow 736 with respect to the inner portion 220C. In a similar fashion as that described with respect to FIG. 7A, the electroadhesive actuator 210C, when activated, resists this movement.

FIGS. 2-6 illustrate various embodiments of a kinesthetically enabled glove equipped with an electroadhesive actuator. Although each of FIGS. 2-6 illustrate the kinesthetically enabled glove with a single electroadhesive actuator, the kinesthetically enabled gloves may be equipped with any combination of the electroadhesive actuators 210, 210A, 210B, 210C described above. For example, a kinesthetically enabled glove in accordance herewith may be equipped with five electroadhesive actuators, one in each finger, for providing resistance to bending and straightening of the respective finger associated with each and an electroadhesive actuator in a wrist or dorsal portion for providing resistance to wrist movements.

Figure 8:
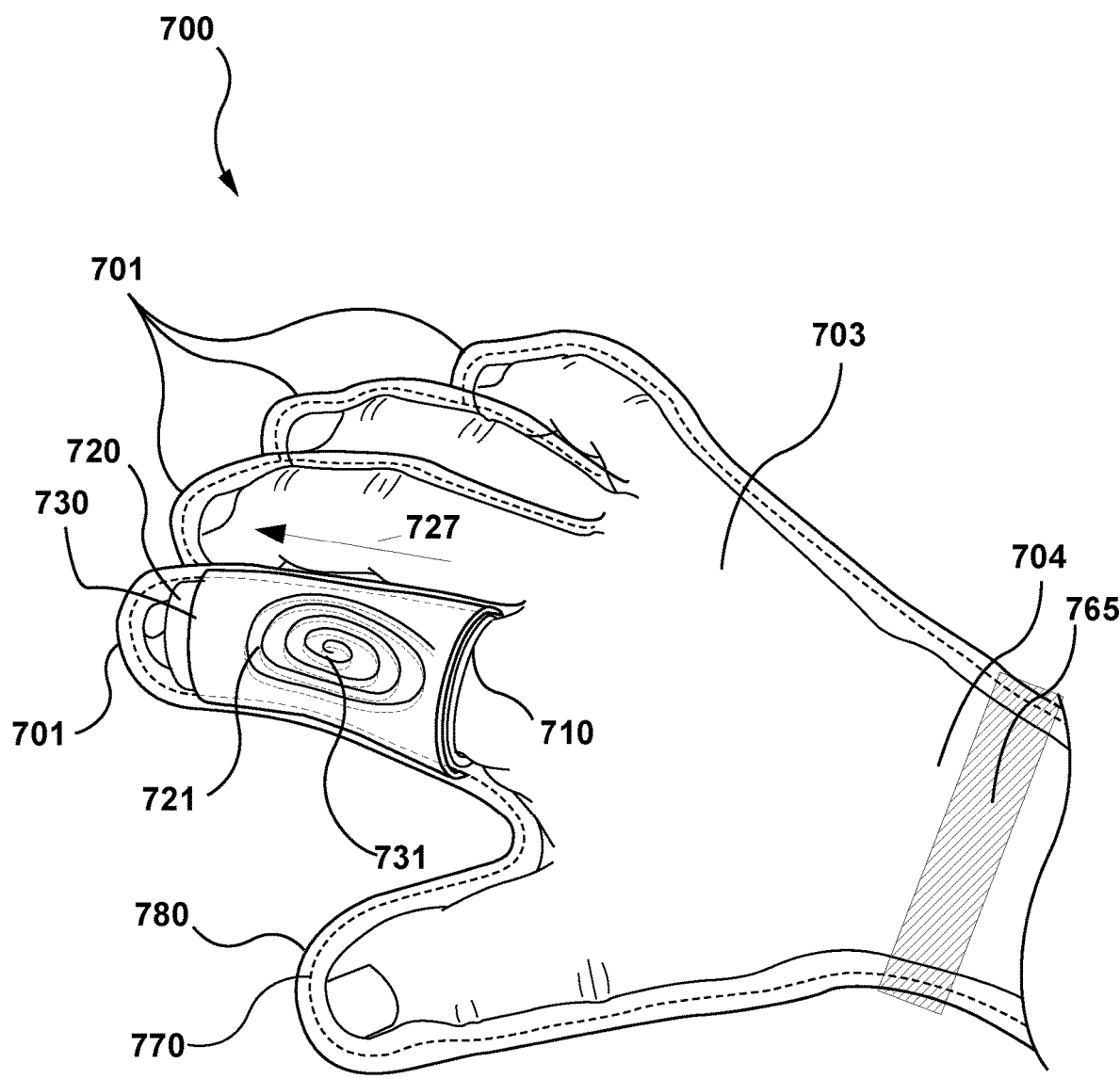
FIG. 8 illustrates an electromagnetic actuator for a kinesthetically enabled glove according to an embodiment.

FIG. 8 illustrates an electromagnetic actuator 710 for a kinesthetically enabled glove 700 according to an embodiment. As illustrated in FIG. 8, the kinesthetically enabled glove 700 includes finger portions 701, a palmar portion (not shown), a dorsal portion 703, and a wrist portion 704. The kinesthetically enabled glove 700 includes an inner body 770 and a glove body 780. The kinesthetically enabled glove 700 may include any or all of the features discussed above with respect to kinesthetically enabled glove 100, and may be configured to interact with a computer system 150 and a camera 160 similarly to kinesthetically enabled glove 100. The kinesthetically enabled glove 700 includes one or more electromagnetic actuators 710. The electromagnetic actuators 710 each include an inner portion 720 configured for contact with the user and an outer portion 730 secured to the glove body 780 of the kinesthetically enabled glove 700. The inner portion 720 and the outer portion 730, as illustrated in FIG. 8, form concentric tubes on which the inner and outer electromagnets 721, 731, are secured. Each of the inner portion 720 and the outer portion 730 circumferentially surround a finger of the user. The inner portion 720 is configured to contact the user's finger at multiple circumferential locations. Thus, when the user moves a finger located inside the inner portion 720, the finger's movements against the inner portion 720 cause the inner portion 720 to move relative to the outer portion 730, which is secured to the glove body 780. The inner portion 720 and the outer portion 730 are arranged such that the inner electromagnet 721 and the outer electromagnet 731 are opposed to one another, i.e., when the fingers are held in a neutral position, the inner electromagnet 721 and the outer electromagnet 731 aligned with one another, having substantial overlap in the cross-sections thereof. As shown in FIG. 8, the kinesthetically enabled glove 700 may be constructed as a glove within a glove, having an interior glove liner serving as the inner body 770 positioned within the glove body 780. According to embodiments hereof, a segment or portion of the glove body 780 may also form the outer portion 730 of the electromagnetic actuator 710, and a segment or a portion of the inner body 770 may form the inner portion 720 of the electromagnetic actuator 710.

As illustrated in FIG. 8, the inner body 770 is a separate glove shaped portion secured to the glove body 780, such as a glove liner. In alternative embodiments, the inner body 770 may form only a portion of a glove shape, and may include, for example, finger segments but no palm covering, or a palm covering but no finger segments. In further embodiments, the inner body 770 may comprise an interior surface of the glove body 780.

According to additional embodiments, the inner portion 720 and the outer portion 730 accommodating the inner electromagnet 721 and the outer electromagnet 731 may be broad strips that do not surround the user's finger. The inner portion 720 may include a cap, a band, or other feature for securement to the user's finger. The outer portion may be secured to the glove body 780 via stitches, adhesives, and/or any other suitable means of securement. In embodiments in accordance herewith, a glove securement portion 765 is provided at the wrist portion 704 to secure the kinesthetically enabled glove 700 to the hand of the user. Similar to the glove securement portion 265 described with respect to FIG. 2, in embodiments, the glove securement portion 765 may include various structures and materials and may be located anywhere within or attached to the kinesthetically enabled glove 700.

In embodiments in accordance herewith, a kinesthetically enabled glove 700 may include one or more electromagnetic actuators 710 located in one or more of the finger portions 701, the dorsal portion 703, and/or the wrist portion 704. Electromagnetic actuators 710 arranged in the finger portions 701 provide resistance to the bending of the fingers, as explained below, while electromagnet actuators 710 located in the dorsal portion 703 and/or wrist portion 704 provide resistance to the bending of the hand at the wrist, as explained below.

The inner electromagnet 721 and the outer electromagnet 731 are each constructed of coils of wire arranged in a flat structure so as to fit within the structure of the glove. As used herein, flat refers to a structure having a height that is relatively small compared to a width and a length. For example, the average of the length and width of a flat structure electromagnet may be 10 times, 100 times, 1,000 times, 10,000 times or more the height of the flat structure. When activated through the application of an electrical current, the inner and outer electromagnets 721, 731 each generate a magnetic field. When the electromagnets 721, 731 are arranged in proximity to one another, the magnetic field of the inner electromagnet 721 and the magnetic field of the outer electromagnet 731 causes an electromagnetic attraction between the two electromagnets, as long as the electrical current is driven through the electromagnets in the appropriate direction.

When not activated, the magnetic actuator 710 provides no resistance to relative movement between the inner portion 720 and the outer portion 730. As the fingers curl from a neutral position, the inner portion 720, secured to the fingers, moves forward with the fingers relative to the outer portion 730, which is secured to the glove body 780. Arrow 727 indicates the direction of movement of the inner portion 720 when the fingers are curled, while the outer portion 730 exhibits little or no movement. When activated in response to a command signal, the magnetic actuator 710 generates an electromagnetic attraction between the inner electromagnet 721 and the outer electromagnet 731. The electromagnetic attraction between the electromagnets 721, 731 provides resistance to the relative movement between the inner portion 720 and the outer portion 730 to which the electromagnets 721, 731 are secured. The resistance to the relative movement provides a resistance to the bending or curling of a finger portion 701 when the electromagnetic actuator 710 is arranged in the finger portion 701. The glove securement portion 765 serves to secure the kinesthetically enabled glove 700 to the user's hand to prevent movement of the wrist portion 704 during use of the electroadhesive actuator 710.

In some embodiments, the electroadhesive actuator 210C may be arranged in a dorsal and/or wrist portion of the kinesthetically enabled glove 700. When arranged in the dorsal portion 703 and/or wrist portion 704 of the kinesthetically enabled glove 700, the electromagnetic actuator is arranged similarly to the electroadhesive actuator 210C as shown in FIG. 6. Each of the inner portion 720 and the outer portion 730 are secured at opposite ends, with the secured portions being located at opposite sides of the wrist joint to facilitate movement during hand bending. That is, the inner portion 720 is secured at a proximal end thereof while the outer portion 730 is secured at a distal end thereof, or vice versa. Relative movement between the inner portion 720 and the outer portion 730 caused by bending the hand at the wrist is resisted by the application of power to the inner electrode 721 and the outer electrode 731.

Figure 9:
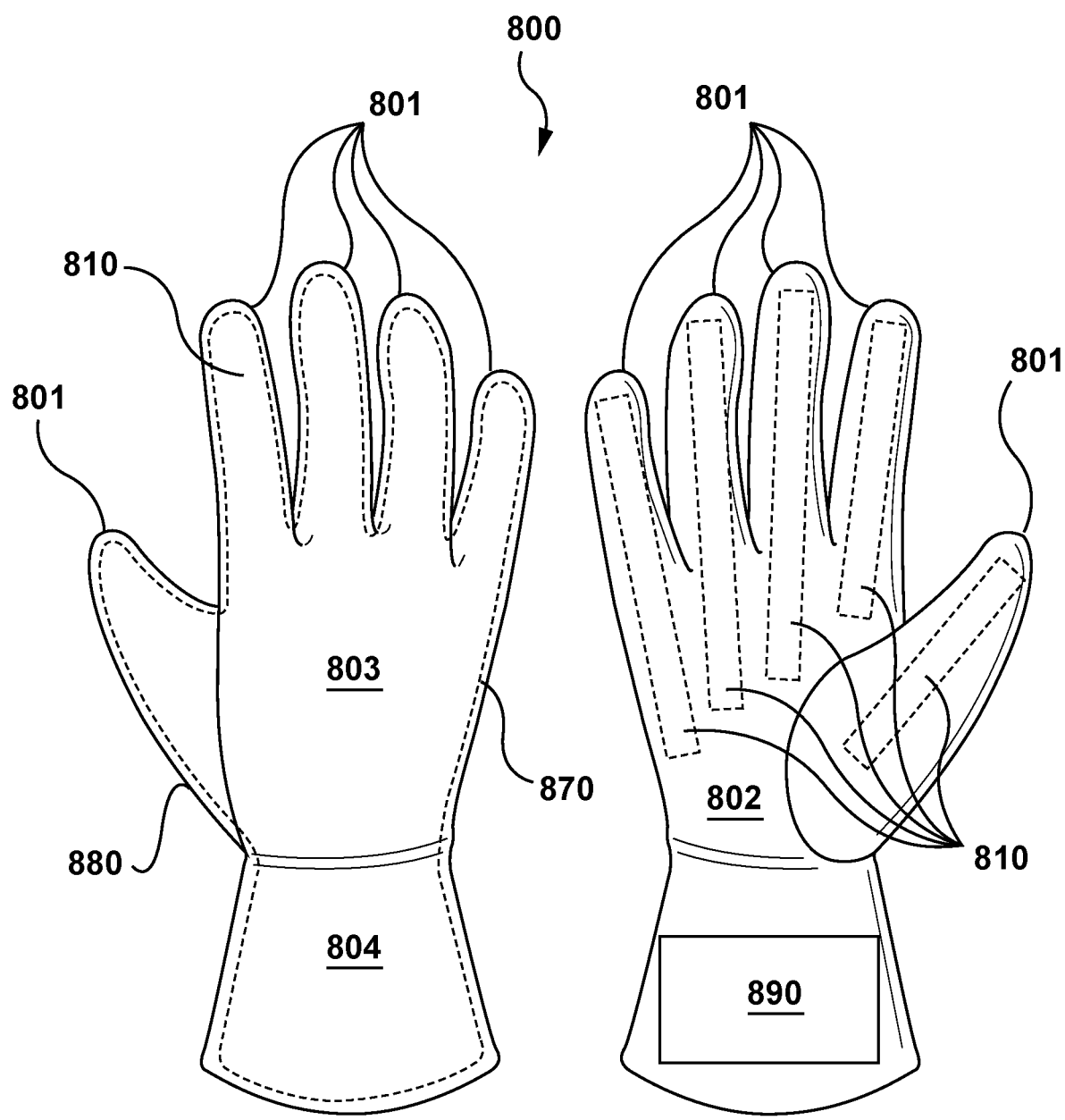
FIG. 9 illustrates a kinesthetically enabled glove having an air jamming actuator according to an embodiment.

FIG. 9 illustrates palmar and dorsal views of a kinesthetically enabled glove 800 equipped with an air jamming actuator 810 according to an embodiment. As illustrated in FIG. 9, the kinesthetically enabled glove 800 includes finger portions 801, a palmar portion 802, a dorsal portion 803, and a wrist portion 804. The kinesthetically enabled glove 800 includes a glove body 880 and an inner body 870. The kinesthetically enabled glove 800 may include any or all of the features discussed above with respect to the kinesthetically enabled gloves 100, 200, etc. and may be configured to interact with a computer system 150 and a camera 160 similarly to kinesthetically enabled glove 100. The kinesthetically enabled glove 800 includes an air jamming actuator 810 disposed in each of the finger portions 801, and in other embodiments may also include one or more air jamming actuator 810 in the dorsal portion 803, and/or wrist portion 804. The kinesthetically enabled glove 800 further includes a vacuum source 890 for activating the air jamming actuators 810. The vacuum source 890 may be, for example, a pump.

As illustrated in FIG. 9, the inner body 870 is a separate glove shaped portion secured to the glove body 880, such as a glove liner. In alternative embodiments, the inner body 870 may form only a portion of a glove shape, and may include, for example, finger segments but no palm covering, or a palm covering but no finger segments. In further embodiments, the inner body 870 may comprise an interior surface of the glove body 880.

Figure 10:
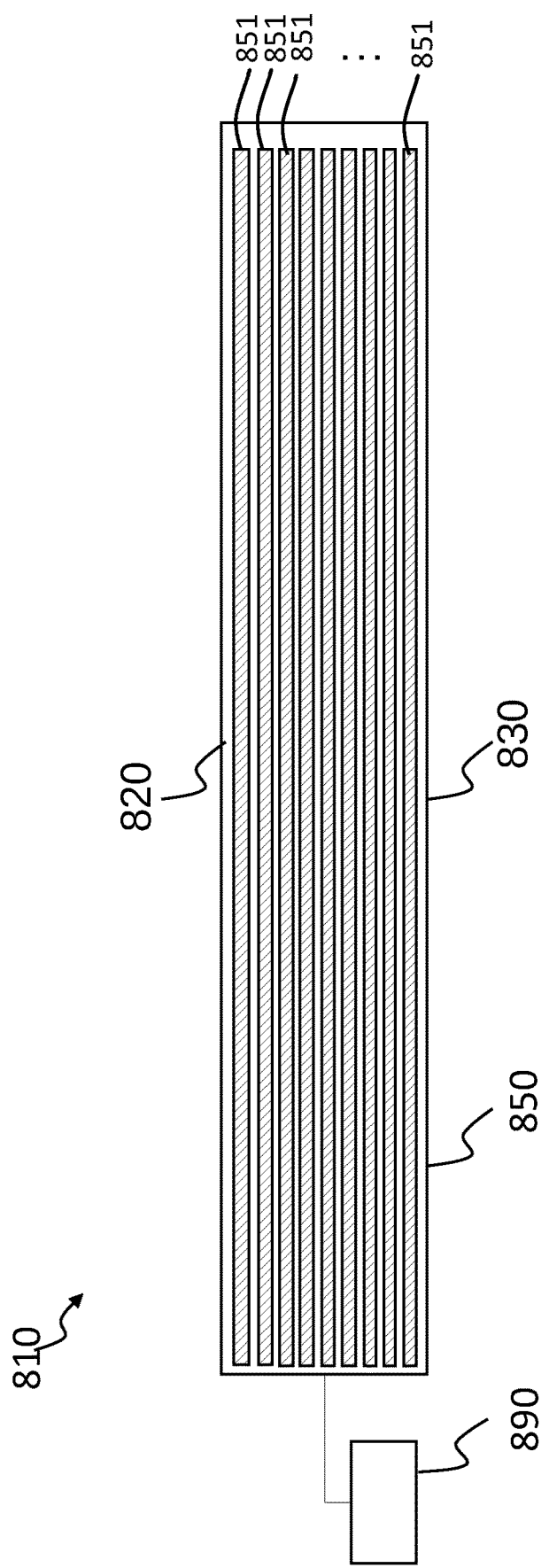
FIG. 10 illustrates details of an air jamming actuator according to an embodiment.

FIG. 10 illustrates an air jamming actuator 810 in accordance with an embodiment hereof. The air jamming actuator 810 operates to increase a stiffness of the actuator by "jamming" together numerous smaller pieces, such as layers or grains. The air jamming actuator 810 includes a flexible bag 850 or other type of container pneumatically connected to the vacuum source 890. The flexible bag 850 is filled with a plurality of material layers 851. In additional embodiments, the flexible bag may include small material pieces including granular particles, grains, and/or other pieces. The vacuum source 890 is configured to evacuate all or a portion of the air or other gas contained in the flexible bag 850 in response to the command signal provided by a processor. The gas evacuation causes the bag to compress the material layers 851 contained within. When forced together, the material layers 851 increase the stiffness of the flexible bag 850, and thereby increase the stiffness of the actuator 810.

The flexible bag 850 of the air jamming actuator 810 includes an inner surface 820 and an outer surface 830, one or both of which are secured to the kinesthetically enabled glove 800. The inner surface 820 may be secured to the inner body 870 while the outer surface 830 may be secured to the glove body 880. The securement of the air jamming actuator 810 to the kinesthetically enabled glove 800 serves to maintain the position of the air jamming actuator 810 within the kinesthetically enabled glove 800. When not activated, the air jamming actuator 810 provides no active resistance to movement of the hand within the kinesthetically enabled glove 800. When activated in response to the command signal, the air jamming actuator 810 stiffens to resist bending. Accordingly, the air jamming actuators 810 located in the finger portions 801 resist a bending movement of the associated finger portions 801. The air jamming actuator 810 may be activated when the fingers are in a neutral position to resist the curling of the fingers and/or may be activated when the fingers are in a curled position to resist the extension of the fingers. When located in a wrist portion 804 of the kinesthetically enabled gloves 800, the air jamming actuator 810 is arranged to span the wrist joint of the user and is activated to resist a bending movement of the hand, either forward or backward at the wrist by creating stiffness across the dorsal portion 803 and the wrist portion 804 of the kinesthetically enabled glove 800.

Figure 11:
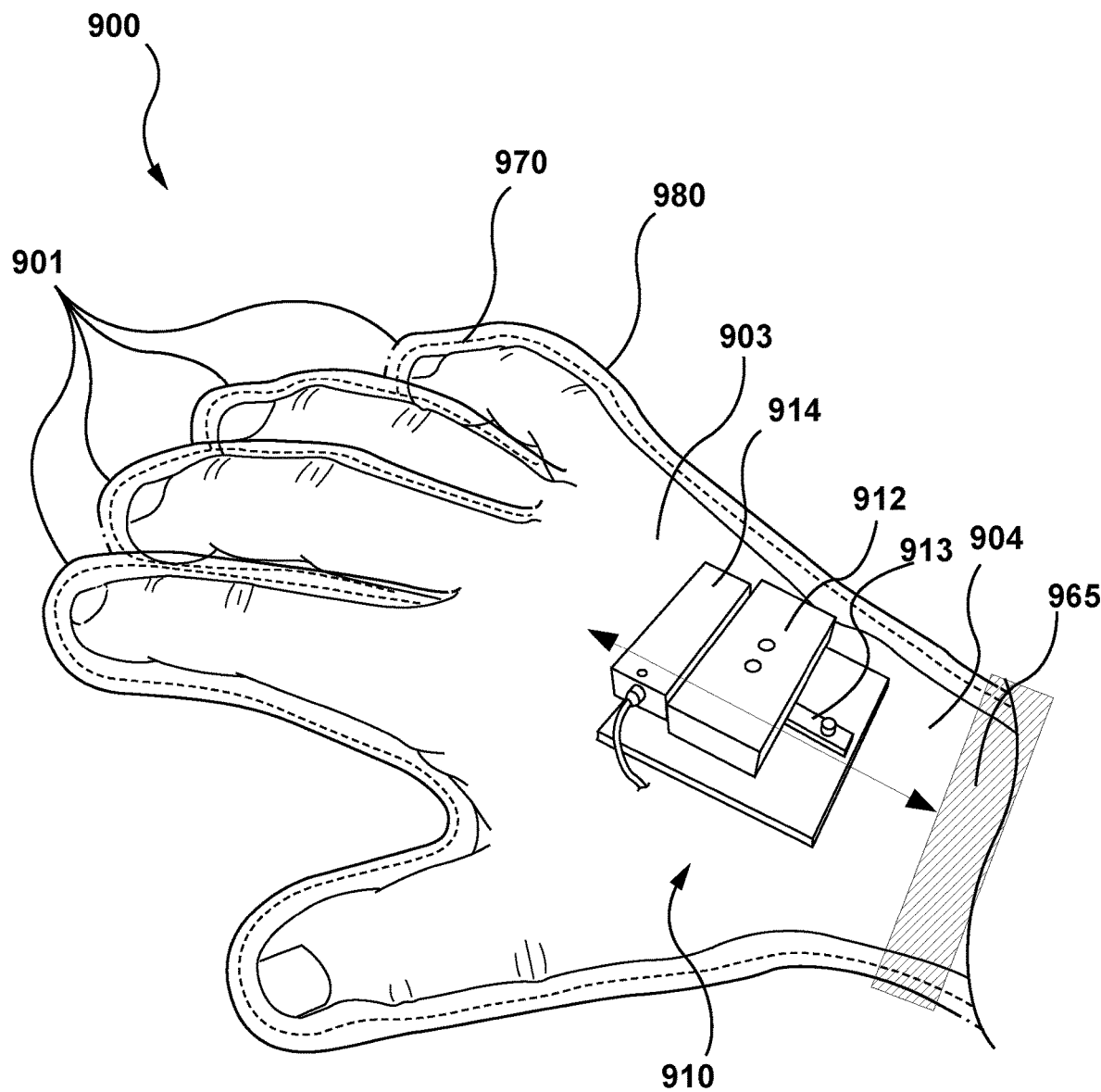
FIG. 11 illustrates a kinesthetic actuator for a kinesthetically enabled glove according to an embodiment.

FIG. 11 illustrates a kinesthetic moving mass actuator 910 for a kinesthetically enabled glove 900 according to an embodiment. As illustrated in FIG. 11, the kinesthetically enabled glove 900 includes a glove body 980 having finger portions 901, a palmar portion (not shown), a dorsal portion 903, and a wrist portion 904. The kinesthetically enabled glove 900 optionally includes an inner liner 970. The kinesthetically enabled glove 900 may include any or all of the features discussed above with respect to kinesthetically enabled gloves 100, 200 etc., and may be configured to interact with a computer system 150 and a camera 160 similarly to kinesthetically enabled glove 100. The kinesthetic actuator 910 is a moving mass actuator and is configured to provide a force to cause movement of the kinesthetically enabled glove 900 to which it is secured. The kinesthetic actuator 910 is secured to a dorsal portion 903 but may be secured to the wrist portion 904 of the kinesthetically enabled glove 900 in another embodiment. In embodiments in accordance herewith, a glove securement portion 965 may be provided at the wrist portion 904 to secure the kinesthetically enabled glove 900 to the hand of the user. Similar to the glove securement portion 965 described with respect to FIG. 2, in embodiments, the glove securement portion 965 may include various structures and materials and may be located anywhere within or attached to the kinesthetically enabled glove 900.

According to an embodiment hereof, one or more kinesthetic actuators 910 may be secured to other portions of the kinesthetically enabled glove 900. For example, kinesthetic actuators 910 may be secured to one or more finger portions 901 and/or to the palmar portion of the kinesthetically enabled glove 900. The kinesthetic actuator 910 may operate to impart force to any portion of the kinesthetically enabled glove 900 to which it is secured, and thus cause movement.

The kinesthetic actuator 910 includes a moving mass 912 and a track 913. The moving mass 912 is mounted to the track 913 which acts as a guide. The moving mass 912 is configured to slide or otherwise move back and forth along the track 913. The kinesthetic actuator 910 further includes an accelerator 914 configured to accelerate the moving mass 912 along the track 913 when a command signal is received. The accelerator 914 may include, for example, a piezo-actuator configured to impart a force to the moving mass 912, or any other type of actuator capable of imparting a force to the moving mass 912. When the kinesthetic actuator 910 is activated by a command signal, the accelerator 914 causes the moving mass 912 to accelerate rapidly along the track 913 in one direction or the other. To accelerate the moving mass 912, a force according to $F = m*a$ must be applied. An equal and opposite force is imparted to the portion of the glove body 980 to which the kinesthetic actuator 910 is secured. This equal and opposite force causes the user to feel a push through the glove. The strength of the push is governed by a weight of the moving mass 912 and the rate at which it accelerates. The glove securement portion 965 may secure the kinesthetically enabled glove 900 to the user's hand or arm during activation of kinesthetic actuator 910 to ensure that the force of the kinesthetic actuator 910 is applied to the user, rather than the glove. In embodiments, the glove securement portion 965 may be omitted as some amount of glove movement may be acceptable.

During activation, the moving mass 912 is moved rapidly to one side of the track 913, causing a force in the opposite direction of its travel. After activation, the moving mass 912 must be moved back to a central position on the track 913 to permit another haptic effect. Under some conditions, the moving mass 912 may be accelerated rapidly back to a central position on the track 913 to impart a force to the user in the opposite direction of the first force. This type of opposite force may be provided where a computer application with which the user is interacting requires such an opposite force. Where no opposite force is required, the moving mass 912 may be returned to the central position of the track 913 with a low acceleration. When the moving mass 912 moves with low acceleration, only a small force is imparted to the user through the kinesthetically enabled glove 900, and the user may not perceive the small force or may easily ignore it. Thus, the mass 912 may be accelerated towards the central position of the track 913 slowly enough so as to be minimally tactilely perceptible or tactilely imperceptible to a wearer of the kinesthetically enabled glove 900. The kinesthetic actuator 910 can thus be "reset" after an activation.

The kinesthetically enabled glove 900 may include one or more kinesthetic actuators 910 arranged in different configurations. For example, a first kinesthetic actuator 910 may be arranged on the dorsal portion 903 and have a track 913 oriented longitudinally with respect to the hand. The first kinesthetic actuator may thus impart a force to the kinesthetically enabled glove 900 in a longitudinal direction, as shown in FIG. 11. A second kinesthetic actuator 910 may be arranged on the dorsal portion 903 and have a track 913 oriented laterally with respect to the user's hand and thus may be configured to impart a force to the kinesthetically enabled glove 900 in a lateral direction, e.g., left or right across the user's body. Additional kinesthetic actuators 910 may be arranged on the finger portions 901 of the glove body 980, laterally, longitudinally, or both. Kinesthetic actuators 910 arranged on the finger portions 901 may selectively impart forces to provide or cause movement of each finger portion 901 individually. Due to the smaller size of the finger portions 901, the kinesthetic actuators 910 arranged thereon may be commensurately smaller.

FIGS. 2-11 illustrate various embodiments of kinesthetically enabled glove(s) equipped with various actuators located in various positions. Embodiments of the kinesthetically enabled gloves may include any combination of these actuators. The actuators may be selected to provide a broad array of kinesthetic and force feedback sensations. For example, kinesthetically enabled gloves may include any combination of electroadhesive actuators 210, 210A, 210B, etc., electromagnetic actuators 710, and air jamming actuators 810 to provide resistance to bending movements of the fingers and bending movements of the wrist, while further including one or more kinesthetic actuators 910 to selectively provide force to the hands and/or fingers of a user through the kinesthetically enabled gloves. Each of a myriad of actuators located in the kinesthetically enabled gloves may be simultaneously and selectively operated to provide different kinesthetic actuations at different locations of the kinesthetic enabled gloves. For example, electroadhesive actuators 210 located in each of the fingers may be selectively actuated to cause resistance to bending in any selected number of fingers. At the same time, kinesthetic actuators 910 may provide movement or force to the kinesthetic enabled glove, e.g., at the back of the hand and/or in any of the fingers, including both those experiencing bending resistance and those not.

Figure 12:
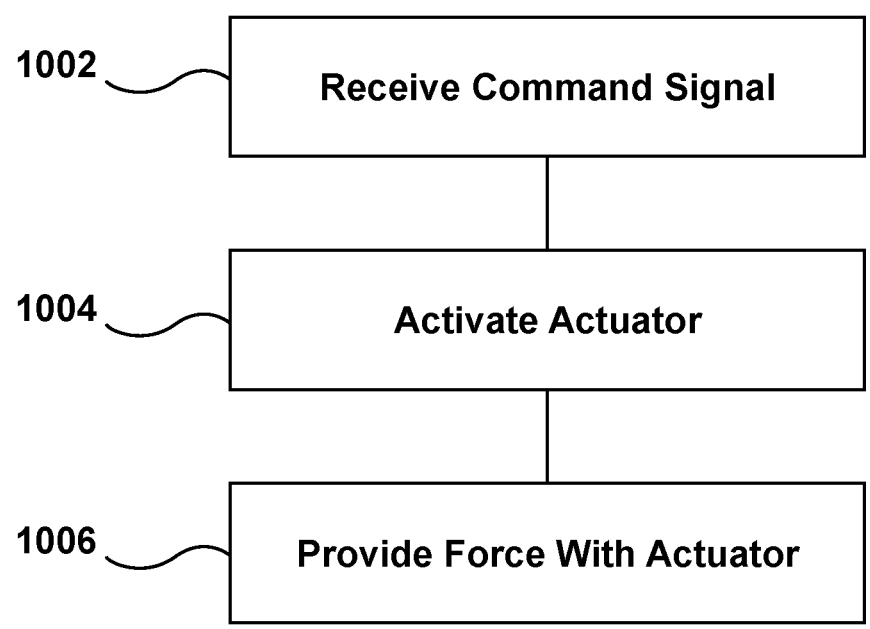
FIG. 12 illustrates a process diagram for a method of actuating a kinesthetically enabled glove in accordance with an embodiment hereof.

FIG. 12 illustrates a process diagram for a method 1000 of actuating a kinesthetically enabled glove. The method 1000 includes steps for activating and operating kinesthetically enabled gloves according to embodiments.

In an operation 1002, method 1000 includes receiving a command signal for actuating a kinesthetically enabled glove. The command signal may be received from an external computer system including a processor. The command signal includes instructions for the activation of one or more actuators associated with the kinesthetically enabled glove. As described above, the kinesthetically enabled glove may include an actuator of one or more types located in different portions of the glove to achieve different feedback results. The command signal may be received at any of multiple actuators associated with the glove and/or may be received by a processor of the kinesthetically enabled glove and rerouted to the intended actuator.

In embodiments, the command signal for actuating the kinesthetically enabled glove may be generated by the processor as part of a feedback process in response to information collected by a sensor or camera located remotely from the kinesthetically enabled glove, such as camera 160. Thus, the kinesthetic effects may be produced according to information collected by an off-hand device with a location remote from the kinesthetically enabled glove.

In an operation 1004, the method 1000 includes activating an actuator in response to the command signal. The actuator may be selected for activation in response to instructions included within the command signal. The selected actuator is determined according to a desired response to be achieved in the kinesthetically enabled glove, including resisting movement and/or causing movement of the glove. Movement resistance may be selectively targeted to occur in specific portions of the glove, e.g., the finger portions and/or wrist portion, based on the selection of actuators for activation and instructions included within the command signal. Movement may be caused in specific directions based on the actuator selected for activation and instructions included within the command signal.

In an operation 1006, the method 1000 includes providing a force in response to the command signal to resist movement of a glove portion and/or to cause movement of the kinesthetically enabled glove. Resisting movement of a glove portion includes resisting a bending movement of one or more finger portions and/or resisting a bending movement of the wrist. Resisting the bending movement is executed through the activation of one or more actuators, including electroadhesive actuators, electromagnetic actuators, and air-jamming actuators. Causing movement of the glove may be executed through the activation of a kinesthetic moving mass actuator, and may be applied to the hand as a whole through a larger actuator and/or to the fingers individually through smaller actuators located directly on the fingers.

Accordingly, the method 1000 makes use of a kinesthetically enabled glove, as described herein, to selectively provide movement and resistance to movement at individual portions of the glove and thus, to individual portions of the user's hands. The kinesthetically enabled gloves, as discussed herein, may thus simultaneously provide bending resistance in one or more fingers and in the wrist while imparting movement to one or more fingers and the hand as a whole. Any such combination of movement and resistance to movement may be provided by embodiments of the kinesthetically enabled gloves as discussed herein.

Kinesthetic actuators for providing ungrounded force feedback are described herein with respect to kinesthetically enabled gloves. Kinesthetically enabled gloves are used in the description for explanatory purposes only, and the devices and methods described herein are not so limited. For example, kinesthetic actuators and actuation methods as described herein may equally be applied to other wearable devices, including, shirts, pants, belts, etc. For example, kinesthetic actuators described herein may be employed with a shirt or pants to resist movement of a user's arms or legs. A person of skill in the art will recognize that other examples are possible without departing from the scope of the invention.

ADDITIONAL DISCUSSION OF VARIOUS EMBODIMENTS

Embodiment 1 is a wearable device for providing kinesthetic effects, comprising:
  a glove including a plurality of finger portions and a glove body; and
  an actuator secured to the glove and configured to receive a command signal indicative of a virtual interaction, and provide a force, in response to the command signal, to execute at least one of a movement of the glove and a resistance to a movement of the glove.

Embodiment 2 includes the wearable device of embodiment 1, wherein:

the actuator is located in at least one finger portion of the plurality of finger portions, and the force provides the resistance to a movement of the glove which is a resistance to a bending movement of the at least one finger portion.

Embodiment 3 includes the wearable device of embodiments 1 or 2, wherein:

the actuator includes an inner portion configured for contact with a finger of a wearer and having an inner electrode secured thereto and an outer portion being secured to the glove and having an outer electrode secured thereto, and the inner electrode and the outer electrode are separated by an insulation layer, and the inner electrode and the outer electrode are configured to provide an electroadhesive attraction in response to the command signal.

Embodiment 4 includes the wearable device of embodiment 3, wherein the electroadhesive attraction is the force providing the resistance to a bending movement of the at least one finger portion.

Embodiment 5 includes the wearable device of any one of embodiments 1 to 4, wherein the outer portion is secured to the glove body at a wrist portion of the glove body.

Embodiment 6 includes the wearable device of any one of embodiments 1 to 5, wherein the glove body further includes an extension portion configured to extend past a wrist of the wearer, the outer electrode of the outer portion of the actuator being secured to the glove body at the extension portion, and the inner electrode of the inner portion being configured to extend along the outer electrode of the outer portion into the extension portion.

Embodiment 7 includes the wearable device of any one of embodiments 1 to 6, wherein the inner portion of the actuator includes an inner tube and the outer portion of the actuator includes an outer tube, the inner tube being located inside the outer tube.

Embodiment 8 includes the wearable device of any one of embodiments 3 to 7, wherein the insulation layer is secured to the inner electrode.

Embodiment 9 includes the wearable device of any one of embodiments 1 to 7, wherein the insulation layer is secured to the outer electrode.

Embodiment 10 includes the wearable device of embodiment 1 or 2, wherein:

the actuator includes an inner portion having an inner electromagnet and being configured for contact with a finger of a wearer and an outer portion having an outer electromagnet and being secured to the glove body, and the inner electromagnet and the outer electromagnet are configured to provide the force via an electromagnetic attraction in response to the command signal.

Embodiment 11 includes the wearable device of any one of embodiments 1 to 10, further comprising a vacuum source configured to evacuate a gas in response to the command signal, wherein the actuator is an air-jamming actuator configured to provide the force when gas in the air-jamming actuator is evacuated by the vacuum source.

Embodiment 12 includes the wearable device of any one of embodiments 1 to 11, wherein:

the actuator is located in the glove body, and the force provides the resistance to a movement of the glove which is a resistance to a bending movement of the glove body.

Embodiment 13 includes the wearable device of any one of embodiments 1 to 11, wherein:

the actuator is a moving mass actuator configured to provide the force; and the force provides the movement of the glove.

Embodiment 14 is a method of providing kinesthetic feedback in a wearable device comprising a glove including a plurality of finger portions and a glove body, the method comprising:

receiving a command signal at an actuator secured to the glove; and providing a force, via the actuator, to execute at least one of a movement of the glove and a resistance to a movement of the glove in response to the command signal.

Embodiment 15 includes the method of embodiment 14, wherein the actuator is located in at least one finger portion of the plurality of finger portions, and the method further comprises providing the force to execute the resistance to a movement of the glove which is a resistance to a bending movement of the at least one finger portion.

Embodiment 16 includes the method of embodiment 14 or 15, further comprising providing, in response to the command signal, an electroadhesive attraction between an inner electrode secured to an inner portion of actuator and an outer electrode secured to an outer portion of the actuator, wherein the inner portion is configured for contact with a finger of a wearer and the outer portion is secured to the glove body.

Embodiment 17 includes the method of embodiment 16, further comprising providing the electroadhesive attraction as the force that executes the resistance to a bending movement.

Embodiment 18 includes the method of any one of embodiments 14 to 17, further comprising:

activating an inner electromagnet secured to an inner portion of the at least one finger portion, the inner portion being configured for contact with a finger of a wearer, and activating an outer electromagnet secured to an outer portion of the least one finger portion, the outer portion being secured to a glove body.

Embodiment 19 includes the method of any one of embodiments 14 to 18, further comprising activating an air-jamming actuator via evacuation of a gas by a vacuum source in response to the command signal.

Embodiment 20 includes the method of any one of embodiments 14 to 19, further comprising providing, in response to the command signal via the actuator located in the glove body, the force as resistance to the movement of the glove which is resistance to a bending movement of the glove body.

Embodiment 21 includes the method of any one of embodiments 14 to 19, further comprising providing, in response to the command signal via the actuator which is a moving mass actuator, the force to cause movement of the glove.

Thus, there are provided systems, devices, and methods of providing haptic and kinesthetic effects via one or more kinesthetically enabled gloves. While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. Stated another way, aspects of the above methods of rendering kinesthetic effects may be used in any combination with other methods described herein or the methods can be used separately. All patents and publications discussed herein are incorporated by reference herein in their entirety.

What is claimed is:

1. A wearable device for providing kinesthetic effects, comprising:
   a glove including a plurality of finger portions and a glove body; and
   an actuator including an inner portion configured for contact with a finger of a wearer and an outer portion secured to the glove and configured to
      receive a command signal indicative of a virtual interaction, and
      provide a force, in response to the command signal, to execute at least one of a movement of the glove by causing relative movement between the inner portion and the outer portion and a resistance to a movement of the glove by resisting relative movement between the inner portion and the outer portion.

2. The wearable device of claim 1, wherein
   the actuator is located in at least one finger portion of the plurality of finger portions, and
   the force provides the resistance to a movement of the glove which further includes a resistance to a bending movement of the at least one finger portion.

3. The wearable device of claim 2, wherein
   the actuator further includes an inner electrode secured to the inner portion and an outer electrode secured to the outer portion, and
   the inner electrode and the outer electrode are separated by an insulation layer, and
   the inner electrode and the outer electrode are configured to provide an electroadhesive attraction in response to the command signal.

4. The wearable device of claim 3, wherein the electroadhesive attraction is the force providing the resistance to a bending movement of the at least one finger portion.

5. The wearable device of claim 3, wherein the outer portion is secured to the glove body at a wrist portion of the glove body.

6. The wearable device of claim 3, wherein the glove body further includes an extension portion configured to extend past a wrist of the wearer, the outer electrode of the outer portion of the actuator being secured to the glove body at the extension portion, and the inner electrode of the inner portion being configured to extend along the outer electrode of the outer portion into the extension portion.

7. The wearable device of claim 3, wherein the inner portion of the actuator includes an inner tube and the outer portion of the actuator includes an outer tube, the inner tube being located inside the outer tube.

8. The wearable device of claim 3, wherein the insulation layer is secured to the inner electrode.

9. The wearable device of claim 3, wherein the insulation layer is secured to the outer electrode.

10. The wearable device of claim 2, wherein
    the inner portion of the actuator has an inner electromagnet and is configured for contact with a finger of a wearer and the outer portion of the actuator has an outer electromagnet and is secured to the glove body, and
    the inner electromagnet and the outer electromagnet are configured to provide the force via an electromagnetic attraction in response to the command signal.

11. A method of providing kinesthetic feedback in a wearable device comprising a glove including a plurality of finger portions and a glove body, the method comprising:
    receiving a command signal at an actuator including an inner portion configured for contact with a finger of a wearer and an outer portion secured to the glove; and
    providing a force, via the actuator, to execute at least one of a movement of the glove by causing relative movement between the inner portion and the outer portion and a resistance to a movement of the glove by resisting relative movement between the inner portion and the outer portion in response to the command signal.

12. The method of claim 11, wherein the actuator is located in at least one finger portion of the plurality of finger portions, and
    the method further comprises providing the force to execute the resistance to a movement of the glove which further includes a resistance to a bending movement of the at least one finger portion.

13. The method of claim 12, further comprising
    providing, in response to the command signal, an electroadhesive attraction between an inner electrode secured to the inner portion of actuator and an outer electrode secured to the outer portion of the actuator.

14. The method of claim 13, further comprising providing the electroadhesive attraction as the force that executes the resistance to a bending movement.

15. The method of claim 12, the method further comprising
    activating an inner electromagnet secured to an inner portion of the at least one finger portion, the inner portion being configured for contact with a finger of a wearer, and
    activating an outer electromagnet secured to an outer portion of the least one finger portion, the outer portion being secured to a glove body.

16. The method of claim 11, further comprising
    activating an air-jamming actuator via evacuation of a gas by a vacuum source in response to the command signal.

17. The method of claim 11, the method further comprising
    providing, in response to the command signal via the actuator located in the glove body, the force as the resistance to a movement of the glove which further includes resistance to a bending movement of the glove body.

18. The method of claim 11, the method further comprising
    providing, in response to the command signal via the actuator which is a moving mass actuator, the force to cause movement of the glove.

19. A wearable device for providing kinesthetic effects, comprising:
    a glove including a plurality of finger portions and a glove body; and
    an actuator located in at least one finger portion of the plurality of finger portions and including:
       an inner portion configured for contact with a finger of a wearer and having an inner electrode secured thereto, and
       an outer portion secured to the glove and having an outer electrode secured thereto, the outer electrode being separated from the inner electrode by an insulation layer;

wherein the actuator is configured to
  receive a command signal indicative of a virtual interaction, and
  provide an electroadhesive force by the inner electrode and the outer electrode, in response to the command signal, to execute a resistance to a movement of the glove which is a resistance to a bending movement of the at least one finger portion.

* * * * *